(12) United States Patent
Carcagno et al.

(10) Patent No.: US 8,322,754 B2
(45) Date of Patent: Dec. 4, 2012

(54) NANOCOMPOSITE COATINGS FOR THREADED CONNECTIONS

(75) Inventors: Gabriel Eduardo Carcagno, Schaan (LI); Klaus Endres, Zweibrücken (DE)

(73) Assignee: Tenaris Connections Limited, Kingstown (VC)

( * ) Notice: Subject to any disclaimer, the term of this patent is extended or adjusted under 35 U.S.C. 154(b) by 1380 days.

(21) Appl. No.: 11/846,489

(22) Filed: Aug. 28, 2007

(65) Prior Publication Data

US 2008/0129044 A1    Jun. 5, 2008

Related U.S. Application Data

(60) Provisional application No. 60/872,615, filed on Dec. 1, 2006, provisional application No. 60/914,699, filed on Apr. 27, 2007, provisional application No. 60/940,690, filed on May 29, 2007.

(51) Int. Cl.
*F16L 15/00* (2006.01)
*F16L 15/08* (2006.01)
*B32B 27/06* (2006.01)
*B32B 27/18* (2006.01)
*B32B 27/38* (2006.01)

(52) U.S. Cl. ........... 285/94; 285/55; 285/119; 285/333; 285/390; 285/423; 428/323; 428/328; 428/329; 428/331; 428/421; 428/413; 428/474.4; 252/387; 252/389.2; 252/389.3; 252/389.23; 252/389.54; 252/389.6

(58) Field of Classification Search .................. None
See application file for complete search history.

(56) References Cited

U.S. PATENT DOCUMENTS

| 3,475,384 A | 10/1969 | Trischler |
| 3,852,222 A | 12/1974 | Field et al. |
| 4,018,944 A | 4/1977 | Hallstrom et al. |
| 4,089,690 A * | 5/1978 | Pantzer et al. ............. 106/14.23 |
| 4,121,000 A | 10/1978 | Wald |

(Continued)

FOREIGN PATENT DOCUMENTS

DE    42 05 819    9/1993

(Continued)

OTHER PUBLICATIONS

Arenas, M. A., et al.: "X-ray photoelectron study of the corrosion bevaviour of galvanised steel implanted with rare earths", Corrorision Science 46 (2004), 1033-1049.

(Continued)

*Primary Examiner* — Vivian Chen
(74) *Attorney, Agent, or Firm* — Knobbe Martens Olson & Bear, LLP

(57) ABSTRACT

Coating systems which provide corrosion resistance and, optionally, lubrication, for threaded connections are disclosed. The compositions comprise a first coating composition comprising polymer matrices of polyimides or epoxies which are modified with small amounts of a fluorine containing polymer. Also present in the coating compositions are corrosion inhibiting agents and inorganic particles having a mean diameter of between approximately 10 nm and 10 μm. Solid lubricants, which may include at least one of PTFE, HDPE, Graphite, and $MoS_2$, are optionally added to provide the first coating with a low coefficient of friction. The coating systems may further comprise a second coating composition, comprising a solid lubricant dispersed within an epoxy resin and a solvent. The first and second coating compositions are deposited on at least a portion of at least one of the pin and box members of the threaded connections.

72 Claims, 34 Drawing Sheets

U.S. PATENT DOCUMENTS

| | | | |
|---|---|---|---|
| 4,157,358 A | | 6/1979 | Field et al. |
| RE30,691 E | | 7/1981 | Hallstrom et al. |
| 4,414,247 A | | 11/1983 | Hubecker et al. |
| 4,544,581 A | | 10/1985 | Pelloski |
| 4,692,988 A | | 9/1987 | Shulver et al. |
| 4,720,518 A | | 1/1988 | Chihara et al. |
| 4,728,546 A | | 3/1988 | Rasmussen |
| 4,816,545 A | * | 3/1989 | Re et al. .................. 528/401 |
| 4,818,619 A | | 4/1989 | Strepparola et al. |
| 4,840,668 A | * | 6/1989 | Gawol et al. .............. 106/14.21 |
| 4,845,136 A | | 7/1989 | Saito et al. |
| 4,868,066 A | | 9/1989 | Whitmore |
| 5,059,640 A | * | 10/1991 | Hegedus et al. ............. 523/451 |
| 5,130,361 A | * | 7/1992 | Hegedus et al. ............. 524/204 |
| 5,192,447 A | * | 3/1993 | Fivizzani .................. 210/697 |
| 5,202,367 A | * | 4/1993 | Hegedus et al. ............. 524/204 |
| 5,216,067 A | | 6/1993 | Yamada et al. |
| 5,253,902 A | | 10/1993 | Petelot et al. |
| 5,352,726 A | | 10/1994 | Hall |
| 5,386,005 A | * | 1/1995 | Mascia et al. .............. 528/110 |
| 5,427,632 A | | 6/1995 | Dolan |
| 5,449,415 A | | 9/1995 | Dolan |
| 5,470,910 A | | 11/1995 | Spanhel et al. |
| 5,498,657 A | | 3/1996 | Sugiyama et al. |
| 5,633,086 A | | 5/1997 | Hsu et al. |
| 5,716,679 A | | 2/1998 | Krug et al. |
| 5,728,465 A | | 3/1998 | Dorfman et al. |
| 5,760,126 A | | 6/1998 | Engle et al. |
| 5,910,522 A | | 6/1999 | Schmidt et al. |
| 5,958,847 A | | 9/1999 | Engle et al. |
| 5,959,426 A | * | 9/1999 | Moeller et al. ............. 318/685 |
| 5,994,447 A | | 11/1999 | Shim et al. |
| 6,008,285 A | | 12/1999 | Kasemann et al. |
| 6,027,145 A | | 2/2000 | Tsuru et al. |
| 6,040,414 A | | 3/2000 | Temtchenko et al. |
| 6,071,564 A | | 6/2000 | Marchetti et al. |
| 6,121,208 A | | 9/2000 | Toyota |
| 6,168,866 B1 | | 1/2001 | Clark |
| 6,187,426 B1 | | 2/2001 | Jonschker et al. |
| 6,228,921 B1 | | 5/2001 | Kasemann et al. |
| 6,287,639 B1 | | 9/2001 | Schmidt et al. |
| 6,291,070 B1 | | 9/2001 | Arpac et al. |
| 6,303,730 B1 | | 10/2001 | Fries et al. |
| 6,316,084 B1 | | 11/2001 | Claus et al. |
| 6,362,135 B1 | | 3/2002 | Greer |
| 6,378,599 B1 | | 4/2002 | Schmidt et al. |
| 6,379,801 B1 | | 4/2002 | Falcone et al. |
| 6,403,164 B1 | | 6/2002 | Jonschke et al. |
| 6,419,147 B1 | | 7/2002 | Daniel |
| 6,455,103 B1 | | 9/2002 | Mennig et al. |
| 6,500,534 B1 | | 12/2002 | Dittfurth et al. |
| 6,503,304 B2 | * | 1/2003 | Korn et al. ................. 106/14.11 |
| 6,576,182 B1 | | 6/2003 | Ravagni et al. |
| 6,579,472 B2 | | 6/2003 | Chung et al. |
| 6,579,835 B2 | | 6/2003 | Scicchitano et al. |
| 6,592,977 B2 | | 7/2003 | Thomas et al. |
| 6,638,600 B2 | | 10/2003 | Gazo |
| 6,659,509 B2 | | 12/2003 | Goto et al. |
| 6,679,526 B2 | * | 1/2004 | Yamamoto et al. ............. 285/55 |
| 6,746,057 B2 | * | 6/2004 | Goto et al. .................. 285/333 |
| 6,758,916 B1 | | 7/2004 | McCormick |
| 6,764,984 B2 | | 7/2004 | Beatty |
| 6,790,532 B1 | | 9/2004 | Gier et al. |
| 6,855,386 B1 | | 2/2005 | Daniels et al. |
| 6,855,396 B1 | | 2/2005 | Mennig et al. |
| 6,869,111 B2 | | 3/2005 | Goto et al. |
| 6,875,479 B2 | | 4/2005 | Jung et al. |
| 6,896,958 B1 | | 5/2005 | Cayton |
| 6,921,110 B2 | | 7/2005 | Morotti et al. |
| 6,971,681 B2 | * | 12/2005 | Dell'Erba et al. ............. 285/55 |
| 6,995,222 B2 | * | 2/2006 | Buckanin et al. ............. 526/242 |
| 7,037,596 B1 | | 5/2006 | Benthien et al. |
| 7,053,149 B2 | | 5/2006 | Anderson et al. |
| 7,169,834 B2 | | 1/2007 | Dobler et al. |
| 7,235,292 B2 | | 6/2007 | Hayashida et al. |
| 7,279,173 B2 | | 10/2007 | Schiestel et al. |
| 7,297,748 B2 | | 11/2007 | Trivedi |
| 7,360,798 B2 | | 4/2008 | Matsumoto et al. |
| 7,390,532 B2 | | 6/2008 | Dellwo et al. |
| 7,473,521 B2 | | 1/2009 | Harada et al. |
| 7,473,721 B2 | | 1/2009 | Harada et al. |
| 7,498,362 B2 | | 3/2009 | Ramsey |
| 7,662,241 B2 | | 2/2010 | Sinko |
| 7,770,935 B2 | * | 8/2010 | Imai et al. .................. 285/94 |
| 2002/0013425 A1 | * | 1/2002 | Johnson et al. ............... 525/438 |
| 2003/0059540 A1 | | 3/2003 | Berni et al. |
| 2003/0159764 A1 | * | 8/2003 | Goto .......................... 148/519 |
| 2003/0160446 A1 | | 8/2003 | Goto et al. |
| 2004/0113423 A1 | * | 6/2004 | Dell'Erba et al. ............. 285/55 |
| 2004/0265233 A1 | | 12/2004 | Holzer et al. |
| 2005/0003203 A1 | | 1/2005 | Brown |
| 2006/0014895 A1 | | 1/2006 | Shiono |
| 2006/0057398 A1 | | 3/2006 | Zimmermann et al. |
| 2006/0089442 A1 | | 4/2006 | Mennig et al. |
| 2006/0153993 A1 | | 7/2006 | Schmidt et al. |
| 2006/0154091 A1 | | 7/2006 | Schmidt et al. |
| 2006/0159909 A1 | | 7/2006 | Aslan et al. |
| 2006/0159923 A1 | | 7/2006 | Becker-Willinger et al. |
| 2006/0194886 A1 | | 8/2006 | Adam et al. |
| 2006/0228505 A1 | * | 10/2006 | Goto et al. .................. 428/36.9 |
| 2007/0044906 A1 | | 3/2007 | Park |
| 2008/0008838 A1 | * | 1/2008 | Arpac et al. .................. 427/386 |

FOREIGN PATENT DOCUMENTS

| | | |
|---|---|---|
| DE | 197 46 885 | 6/1999 |
| DE | 198 59 686 | 6/2000 |
| DE | 100 53 954 | 10/2000 |
| DE | 101 49 148 | 5/2002 |
| DE | 100 59 487 | 6/2002 |
| DE | 10 2004 008772 | 9/2005 |
| EP | 0 230 112 | 7/1987 |
| EP | 0 570 254 | 11/1993 |
| EP | 0 812 891 | 9/1997 |
| EP | 0 810 259 | 12/1997 |
| EP | 0 848 023 | 6/1998 |
| EP | 0 973 958 | 1/2000 |
| EP | 1 068 372 | 1/2001 |
| EP | 1 093 032 | 4/2001 |
| EP | 1 211 451 | 6/2002 |
| EP | 1 284 307 | 2/2003 |
| EP | 1 548 346 | 5/2003 |
| EP | 1 378 699 | 1/2004 |
| EP | 1 462 496 | 9/2004 |
| EP | 1 614 718 | 7/2005 |
| EP | 1 718 690 | 11/2006 |
| EP | 1 757 442 | 2/2007 |
| JP | 07228962 | 2/1994 |
| JP | 2001065752 | 8/1999 |
| JP | 2001065754 | 8/1999 |
| JP | 2001099364 | 8/1999 |
| JP | 2006102744 | 10/2005 |
| WO | WO 89/03739 | 5/1989 |
| WO | WO 95/13326 | 5/1995 |
| WO | WO 97/16479 | 5/1997 |
| WO | WO 97/46285 | 12/1997 |
| WO | WO 98-22241 A2 | 5/1998 |
| WO | WO 99/11725 | 3/1999 |
| WO | WO 99-50477 A1 | 10/1999 |
| WO | WO 00/63312 | 4/2000 |
| WO | WO 00/37577 | 6/2000 |
| WO | WO 00/40633 * | 7/2000 |
| WO | WO 00/59554 | 10/2000 |
| WO | WO 02/079325 | 10/2002 |
| WO | WO 03/099735 A2 | 12/2003 |
| WO | WO 2005/080465 | 9/2005 |
| WO | WO 2005/105304 A2 | 11/2005 |
| WO | WO 2005/105706 A1 | 11/2005 |
| WO | WO 2005/120154 | 12/2005 |
| WO | WO 2006/037591 A2 | 4/2006 |
| WO | WO 2006/066856 A1 | 6/2006 |
| WO | WO 2006/066858 A1 | 6/2006 |
| WO | WO 2006/075774 | 7/2006 |
| WO | WO 2006/077124 A2 | 7/2006 |
| WO | WO 2006/077125 A1 | 7/2006 |
| WO | WO 2006/077140 A1 | 7/2006 |

| WO | WO 2006/104251 | 10/2006 |
| WO | WO 2007/063079 | 6/2007 |
| WO | WO 2008/090411 A2 | 7/2008 |

OTHER PUBLICATIONS

Asmatulu, R., et al.: "Corrosion Protection of Materials by Applying Nanotechnology Associated Studies", Mat. Res. Soc. Symp. Proc. Vo. 788 2004 Materials Research Society.

Birkholz, von M., et al.: "Metalloxid-Metall Nanokompositschichten für Verschleiß- und Korrosionsschutz", Tribologie & Schmierungstechnik, 51 Jahrgang Mar. 2004.

Bram, Ch., et al.: "Self assembled molecular monolayers on oxidized inhomogeneous aluminum surfaces", Fresenius J. Anal. Chem. (1997) 358, 108-111.

Buchwalter, L. P., "Adhesion of polyidies to metal and ceramic surfaces: an overview", J. Adhesion Sci. Technol. vol. 4, No. 9, pp. 697-721 (1990).

Jain, A., et al.: "A quantitative study of moisture adsorption in polyimide and its effect on the strength of the polyimide/silicon nitride interface", Acta Materialia, 53 (2005) 3147-3153.

Llevbare, G. O., et al.: The inhibition of pitting corrosion of stainless steels by chromate and molybdate ions, Corrorsion Science 45 (2003) 1545-1569.

Li, Y. Q., et al.: "Preparation and Characterization of Transparent ZnO/epoxy nanocomposites with high-UV shielding efficiency", POLYMER 47 (2006) 212-2132.

Liu, C., et al.: "Co-deposition of titanium / polytetrafluoroethylene films by unbalanced mangetron sputtering, Surface and Coatings Technology 149 (2002) 143-150.

Matuszczak, S. et al.: "An approach to fluorinated surface coatings via photoinitiated cationic cross-linking of mixed epoxy and fluoroepoxy systems", Journal of Fluorine Chemistry 102 (2000) 269-277.

McCook, N. L., et al.: "Epoxy ZnO, and PTFE Nanocomposite: Friction and Wear Optiminization", Tribology Letters, vol. 22 No. 3, : 253-257 Jun. 2006.

Montefusco, F., et al.: "New Difunctional Fluoro-expoxide Monomers: Synthesis, Photopolymerization and Charactrization", Polymer, 45 (2004) 4663-4668.

Racicot, R. et al.: "Corrosion Protection of Aluminium Alloys by Double-Strand Polyaniline", Synthetic Metals 85 (1997) 1263-1264.

Romagnoli, R., et al.: "High performance anticorrosive epoxy paints pigmented with zinc molybdenum phosphate", Jocca-Surface Coatings International 83 (1): 27-32 Jan. 2000, pp. 27-32.

Sangermano, M., et al.: "Fluorinated epoxides as surface modifying agents of UV-curable systems", J Appl Polym Sci 2003;89:1529.

Schnurer, A. U., et al.: "Photopolymerized Expoxide Copolymer Thin Films with Surfaces Highly Enriched with Sulfonyl Floride Groups", Chem Mater, 1996, 8, 1475-1481.

Steyer, P., et al.: "Improvement of high temperature corrosion resistance of tool steels by nanostructured PVD coatings", Materials Science Forum ols. 426-432, (2003) pp. 2503-2508.

Veleva, L., et al.: "Corrosion electrochemical behavior of epoxy anticorrosive paints based on zinc molybdenum phosphate and zinc oxide", Progress in Organic Coatings 36 (1999), 211-216, pp. 211-216.

Voevodin, N. N., et al.: "Evaluation of Corrosion Protection Performance of Sol-Gel Surface Treatments on AA2024-T3", 33rd International SAMPE Technical Conference, Nov. 5-8, 2001, 983-997.

Walter, G.W.: "A Critical Review of the Protection of Metals by Paints", Corrosion Science, vol. 26, No. 1, pp. 27-38, 1986.

Yu, Y. H., et al.: "Preparation and Properties of Polyimide-Clay Nanocomposite Materials for Anticorrosion Application", Journal of Applied Polymer Science, Jun. 15, 2004, vol. 92, No. 6, 3573-3582.

Chi-Ming Chan, "Polymer Surface Modification and Characterization", Munich: Hanser Publisher; 1994 (front and back cover, title page, and copyright page submitted).

Hougham G., Cassidy P.E., Johns K., Davidson T., Editors, "Fluoropolymers 1 and 2", New York: Kluwer Academic/Plenum Publishers; 1999. (front and back covers, title pages, and copyright pages submitted).

Scheirs J, Editor, "Modern Fluoropolymers", New York: Wiley; 1997. (front and back cover, title page, and copyright page submitted).

R.G. Dillingham, C. Moriarty, "The Adhesion of Isocyanate-Based Polymers to Steel", J. of Adhesion, 2003, 79, 269-285.

Y. Zhu, J.O. Iroh, "Journal of Advanced Materials", 2002, 34, 16-21.

Zhang, Ergeng; Long, Kang; Wang, Zhiwen, "Corrosion resistance of nanocomposite coatings on carbon steel by using EIS measurement", Fushi Kexue Yu Fanghu Jishu; (2002), 14(6), 337-339 CODEN: FKFJED; ISSN: 1002-6495.

Jimenez-Morales, A.; Simancas, J.; Garcia-Urena, J. A.; Galvan, J. C., "Nanocomposite materials with controlled ion-mobility for the development of anticorrosive coatings with high metal/polymer adhesion", International Corrosion Congress: Frontiers in Corrosion Science and Technology; 15th, Granada, Spain, Sep. 22-27, 2002, 460/1-460/8 Publisher: National Centre for Metallurgical Research, Madrid Spain.

International Preliminary Report on Patentability from International Application No. PCT/IB2007/004484, Jun. 3, 2009, 1 page.

Written Opinion from International Application No. PCT/IB2007/004484, Jun. 1, 2009, 5 pages.

International Search Report from International Application No. PCT/IB2007/004484, Sep. 1, 2008, 4 pages.

\* cited by examiner

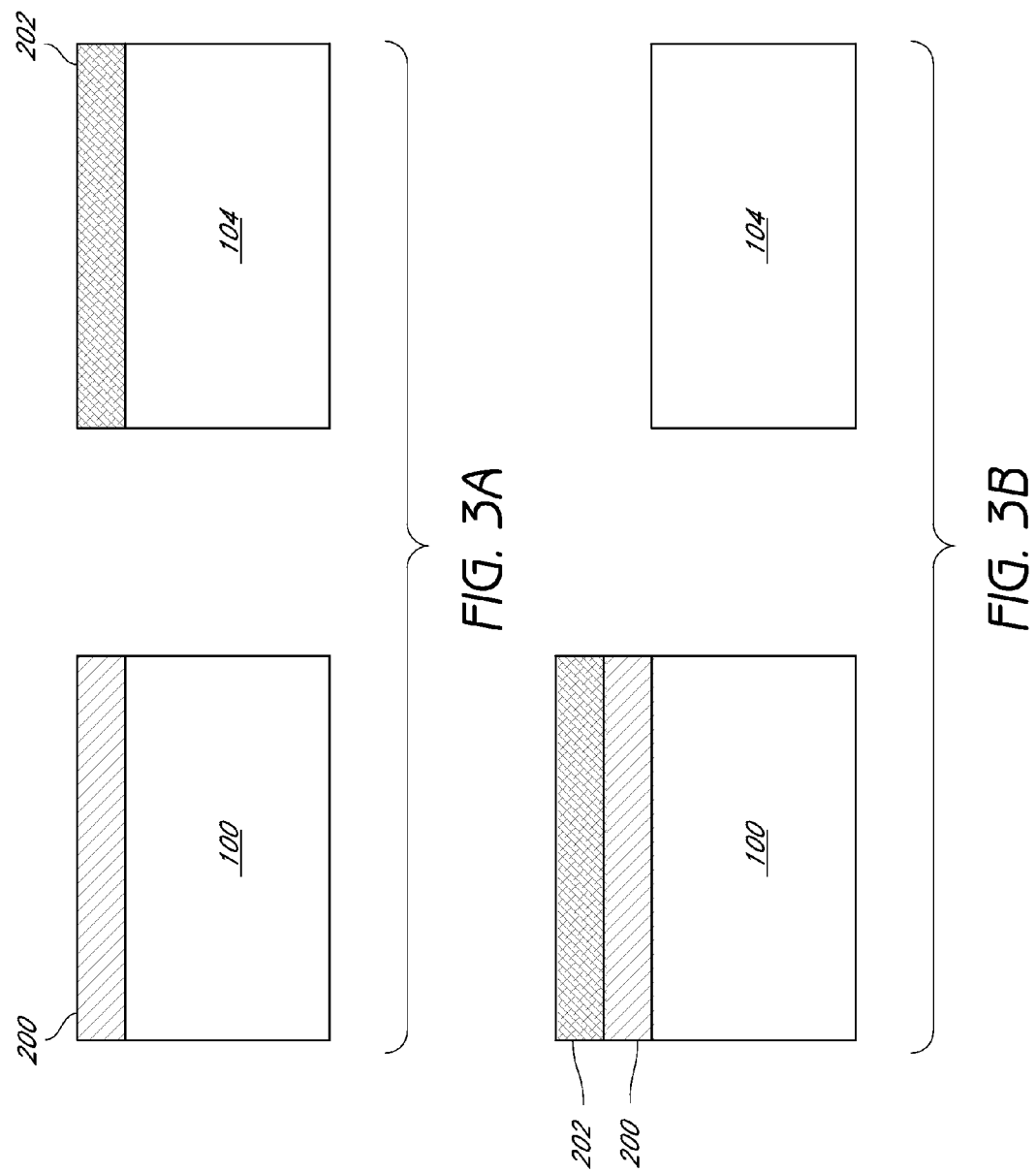

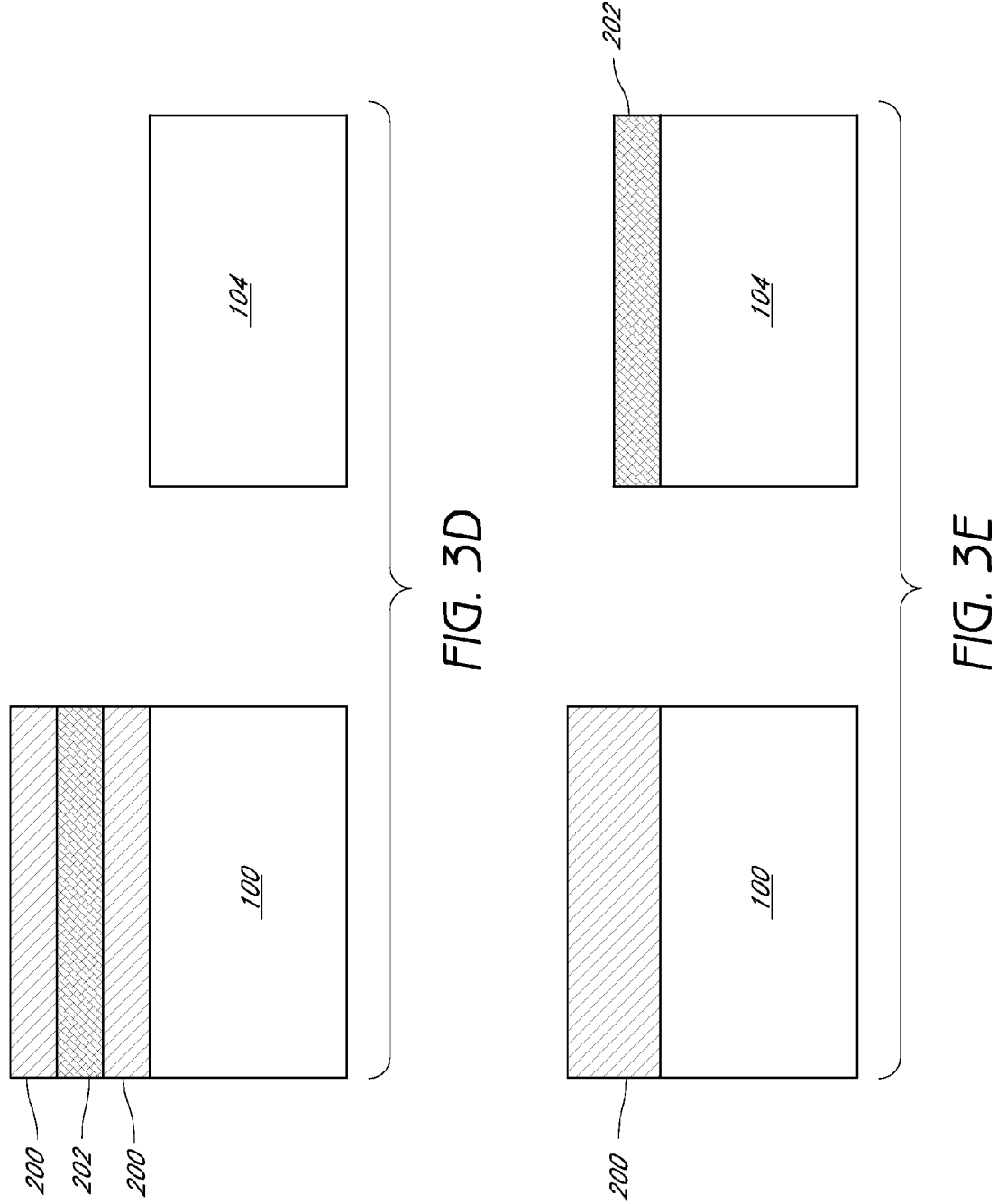

TE64

TE67

NANOCOMPOSITE COATINGS FOR THREADED CONNECTIONS

CROSS REFERENCE TO RELATED APPLICATIONS

This application claims the benefit of priority under 35 U.S.C. §119(e) of U.S. Provisional Application No. 60/872,615, filed on Dec. 1, 2006, entitled Nanocomposite Coatings for Lubrication and Corrosion Resistance, U.S. Provisional Application No. 60/914,699, filed Apr. 27, 2007, entitled Polymer Coating for Lubricating and Corrosion Resistance, and U.S. Provisional Patent Application No. 60/940,690, filed May 29, 2007, entitled Coatings for Lubrication and Corrosion Resistance, the entirety of each of which is incorporated herein by reference.

BACKGROUND OF THE INVENTION

1. Field of the Invention

Embodiments of the invention relate to coating systems, particularly for threaded connections, and, in one embodiment, to nanocomposite coatings for corrosion resistance.

2. Description of the Related Art

In oilfields, it is common practice to use metallic pipes to extract oil or gas from underground reservoirs or pools. This extraction technique generally requires the boring of a well in the earth and internal casement of the well with relatively large diameter metallic tubes, referred to as the casing, to provide structural stability to the well and prevent it from collapsing. Subsequently, once the necessary depth of the well is achieved, a string of metallic pipes of smaller diameter, referred to as the tubing, are placed in the well in order to pump the gaseous or liquid hydrocarbons to the surface. The pipes which form the tubing are joined in a string of defined length which is sufficient to reach the depth necessary for extraction. Both the casing and tubing strings are formed of pipe segments, which are joined together using threaded connectors.

During assembly of either of the casing or tubing pipes, galling in the threads and other surfaces of the pipes which are in sliding contact is a significant problem which may arise. It is common practice to use dope or grease on the surface of the threads of male and female elements of the threaded connection during assembly of the pipes in order to avoid galling. The dope typically employs small particles of heavy metals such as Pb or Cu.

The use of dope presents significant drawbacks, however. Notably, excessive concentrations of heavy metals can result in their accumulation in the bodies of humans and animals, causing serious illness. Furthermore, the heavy metals present in dope may possibly contaminate soil, groundwater, and ocean water, presenting an environmental hazard. Furthermore, in light of these hazards, strict regulations prohibiting discharge of heavy metals requires precautions when utilizing dope that increases the cost of its use.

In addition to the aforementioned issues, the use of dope necessitates other operations, such as cleaning and doping of the threaded connections in the field during use. These operations are expensive and time consuming, however, as they are labor intensive. Additionally, these operations expose personnel to safety risks, as they require exposure to moving pipes and often take place under adverse conditions.

Another potential risk in the use of dope is the danger of either "underdoping" or "overdoping." In underdoping, insufficient dope is provided and/or the dope fails to distribute over the entire surface of the threaded connection, resulting in a failure to adequately inhibit galling. While application of excess dope can address underdoping, this approach risks overdoping, the condition of laying too much dope on the threads of the connectors. Overdoping has the potential consequence that, during assembly of the connector, the excess of dope cannot be evacuated through the end of the threaded portions of the pipe segments. The trapped dope can thus develop high pressure within the connector that results in plastic deformation of the pipe segments in the threaded portion. In extreme cases, such plastic deformation may cause the collapse of the male member of the joint, rendering the connector ineffective, and requiring replacement of the pipe segments and/or the sleeve.

Anti-galling solutions which do not employ dope have been examined to address these problems. In one aspect, international patent application WO2006/075774 to Imai, et al. discloses a coating composition containing a lower layer, comprising a solid lubricating powder and a binder, and an upper coating layer of a solid corrosion protective coating without solid particles. At the time of fastening the joint, the corrosion protective coating gradually wears in the contact portions due to the friction occurring during fastening, exposing the underlying solid lubricating coating which provides its lubricating action.

In another aspect, U.S. Pat. No. 5,253,902 to Petelot, et al. describes an anti-seizing coating for protection of metallic threaded tubes. The coating comprises a thin lead oxide layer, produced by oxidation of a lead layer, which is formed on an underlying layer of copper, nickel, or chromium, which is in turn formed upon the substrate.

In a further aspect, International Patent Application WO/2006/104251 to Goto, et al. discloses a threaded joint having improved galling and corrosion resistance having a lower layer of a viscous liquid or semisolid lubricating coating comprising at least wax and a fatty acid alkaline earth metal salt without heavy metals. The coating also comprises an upper layer of a dry solid coating formed from an aqueous resin coating composition.

Each of these approaches has drawbacks, however. The approach of Imai relies upon a relatively soft corrosion protective coating which is worn through to expose the lubricating layer. As a result, the mechanical durability of the corrosion protective layer is low and this layer may wear away over time in undesired areas, significantly reducing the corrosion protection ability of the coating. The approach proposed by Petelot employs heavy metals, such as lead and copper, resulting in the attendant environmental and toxic hazards discussed above. The approach proposed by Goto is also problematic in that the lower layer of a liquid or semisolid lubricating coating will be subject to the problems of overdoping or underdoping when applying the lower layer composition.

For at least the foregoing reasons, there is a need for protection systems which provide improved corrosion resistance, especially in the severe environments faced within the oil and gas production industries.

SUMMARY OF THE INVENTION

Embodiments of the present disclosure provide a threaded joint. In one embodiment, the threaded joint comprises a pin member and a box member, where the pin member possesses a first thread portion adapted to mate with a second thread portion of the box member. The threaded joint further comprises a first coating composition deposited on at least a portion of at least one of the pin and box members. In one embodiment, the first coating composition comprises:

a polymer;

a fluorine containing polymer modifier;

at least one anticorrosion additive; and at least one metal oxide having a diameter ranging between about 10 nm and 10 μm.

In certain embodiments, the first coating composition may be combined with a second coating composition which is deposited on at least a portion of at least one of the pin and box members. In one embodiment, the second coating composition comprises:

a polymer;

a solid lubricant dispersed within the polymer;

a metal oxide; and a solvent.

Another embodiment of the present disclosure also provides a threaded joint. In one embodiment, the threaded joint comprises a pin member and a box member, where the pin member possesses a first thread portion adapted to mate with a second thread portion of the box member. The threaded joint further comprises a first coating composition deposited on the thread portion of at least one of the pin and box members. In one embodiment, the first coating composition comprises a polymer selected from the group consisting of epoxies and polyimides;

about 0.5 to 15 wt. % of a perfluoropolyether;

about 5 to 15 wt. % of at least one of an anticorrosion compound selected from the group consisting of a zinc calcium strontium orthophosphate silicate hydrate compound, a zinc calcium aluminum strontium orthophosphate polyphosphate silicate hydrate, a zinc aluminum molybdenum orthophosphate hydrate, a zinc nitroisophthalate, and a zinc phosphomolybdate; and about 10 to 15 wt. % zinc oxide having a mean diameter ranging between approximately 10 nm to 10 μm;

where the balance of the first coating composition is comprised of the polymer and wherein the percentage of each component is on the basis of the total weight of the first coating composition.

In another embodiment, a threaded joint comprises a pin member and a box member, where the pin member possesses a first thread portion adapted to mate with a second thread portion of the box member. The threaded joint also comprises a first coating composition deposited on the thread portion of at least one of the pin and box members. The first coating composition comprises a polymer;

about 0.5 to 15 wt. % of a fluorine containing polymer modifier;

about 5-15 wt. % of a corrosion inhibiting agent comprising at least one of Zn, Ca, Mg, Sr, Al, phosphate functional groups, molybdate functional groups, phosphomolybdate functional groups, and phosphosilicate functional groups; and about 10-15 wt. % of inorganic particles having a mean diameter ranging between approximately 10 nm and 10 μm;

where the balance of the first composition is comprised of the polymer and where the percentage of each component is on the basis of the total weight of the first coating composition.

The embodiments of the present disclosure additionally provide a method of protecting a threaded joint. In one embodiment, the method comprises providing a pin member and a box member, where the pin member possesses a first thread portion adapted to mate with a second thread portion of the box member. The method further comprises providing a first composition. The first coating composition comprises:

a polymer;

about 0.5 to 15 wt. % of a fluorine containing polymer modifier;

about 5-15 wt. % of a corrosion inhibiting agent comprising at least one of Zn, Ca, Mg, Sr, Al, phosphate functional groups, molybdate functional groups, phosphomolybdate functional groups, and phosphosilicate functional groups; and about 10-15 wt. % of inorganic particles having a mean diameter ranging between approximately 10 nm and 10 μm;

where the balance of the first composition is comprised of the polymer and where the percentage of each component is on the basis of the total weight of the first coating composition.

The method further comprises providing a second coating composition. The second coating composition comprises a dry film lubricant.

The method also comprises applying each of the first and the second coatings on at least the thread portion of at least one of the pin and box members.

A further embodiment of the disclosure provides a threaded joint. The joint comprises:

a pin member and a box member, where the pin member possess a first thread portion adapted to mate with a second thread portion of the box member, where at least one surface of the pin or the box member is sandblasted;

a first coating composition deposited on the thread portion of the pin member, comprising:

an epoxy;

about 0.5 to 15 wt. % of a perfluoropolyether;

about 5 to 15 wt. % of at least one of an anticorrosion compound selected from the group consisting of zinc calcium strontium orthophosphate silicate hydrate compound, zinc calcium aluminum strontium orthophosphate polyphosphate silicate hydrate, zinc aluminum molybdenum orthophosphate hydrate, zinc nitroisophthalate, and zinc phosphomolybdate; and about 10 to 15 wt. % zinc oxide having a mean diameter ranging between approximately 10 nm to 10 μm;

where the balance of the first coating composition is comprised of the epoxy and where the percentage of each component is on the basis of the total weight of the first coating composition; and a second coating composition deposited on the thread portion of the box member, comprising:

about 4 to 16 wt. % polytetrafluoroethylene (PTFE);

about 8 to 24 wt. % of a reactive epoxy;

about 1 to 6 wt. % titanium dioxide; and a solvent;

where the amount of each component is on the basis of the total weight of the second coating composition.

Other embodiments of the present disclosure are directed to compositions that may be applied to a threaded joint or other surfaces.

BRIEF DESCRIPTION OF THE DRAWINGS

FIGS. 3A-3E are schematic illustrations of the mating surfaces of the pin and box members, illustrating configurations of embodiments of the first and second coating systems;

DETAILED DESCRIPTION OF THE PREFERRED EMBODIMENTS

Figure 1:
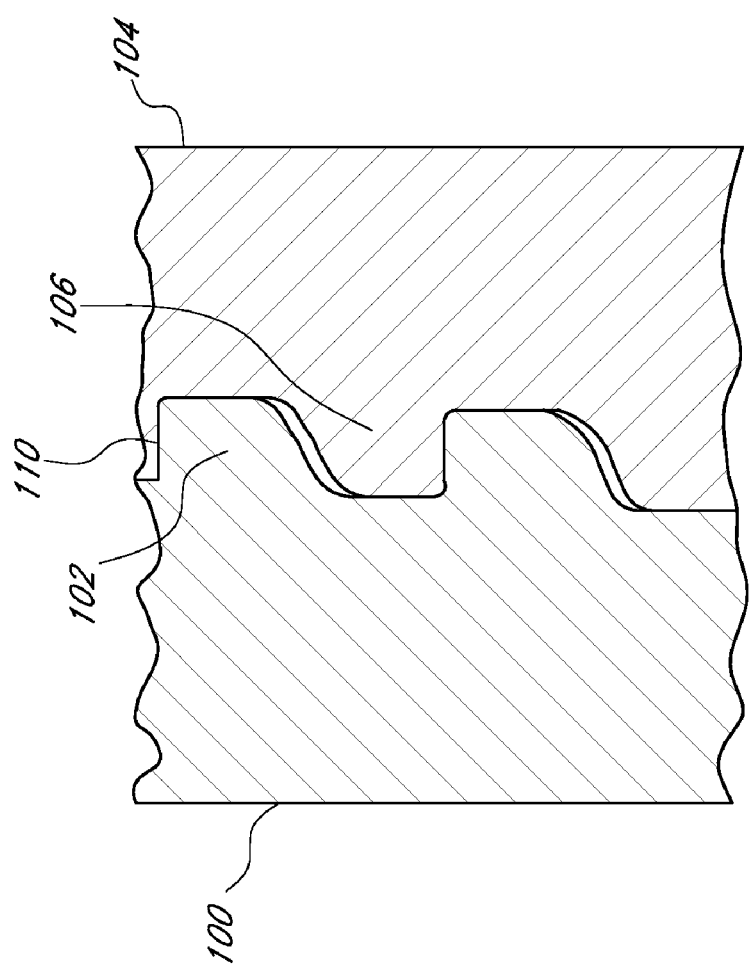
FIG. 1 is a cross sectional view of an embodiment of a joint comprising mating threads of a pin member and box member.

Embodiments of the present disclosure provide coating systems, and methods of manufacture, for the protection of threaded connections. The coating systems, in certain embodiments, comprise at least a first coating which is configured for deposition upon at least a portion of at least one of the surfaces of the threaded connection in order to provide at least corrosion resistance. Optionally, the first coating may also provide lubrication. In alternative embodiments, the coating systems comprise the first coating in combination with a second coating composition which is configured so for deposition upon at least a portion of at least one of the surfaces of the threaded connection in order to provide lubrication. In particular, the coatings are suitable for applications such as threaded steel pipe connections, where extremely high loads and high local temperatures, caused by friction during the assembly process, are present. Additional details on threaded steel pipes can be found in U.S. Pat. No. 6,921, 110, entitled "Threaded Join for Tubes", U.S. Pat. No. 6,971, 681, entitled "Threaded Pipe with Surface Treatment," and International Patent Application Number WO/2007/063079, entitled "Threaded Connections With High and Low Friction Coatings," the entirety of each of which is hereby incorporated by reference.

The coating systems discussed below provide significant performance advantages when utilized with threaded connections. Generally, manufactured pipes are transported overseas, during which time they are exposed to the marine environment. Furthermore, manufactured pipes are typically stored in open air close to a rig site for long periods of time, and are subjected to the local weather conditions, such as rain and low or high temperatures. Exposure to these types of environments can lead to corrosion, resulting in rust formation which is detrimental not only for pipe assembling but for connection integrity and performance as well. Thus, conventional connection systems employ storage compounds in order to avoid corrosion during pipe transportation and storage. The storage compounds must be removed just before pipe assembling and a running dope compound is applied to assist the fastening of pipes.

Advantageously, the dope-free connections described herein possess anti-corrosion properties and, optionally, lubrication properties. Thus, these connections may be processed at the mill facilities, shipped, and stored without further treatment prior to assembly. As a result, the extra steps of removing the storage compound and applying the running dope compound can be avoided, reducing the time and cost to assemble the pipes.

In certain embodiments, the first coating composition comprises a single layered, polymer matrix having corrosion inhibiting additives dispersed therein. The additives provide the coating with the ability to protect the underlying threaded connection from corrosion, while the polymer matrix provides the first coating composition with suitable temperature stability and adhesion. In alternative embodiments, nanoscale reinforcements may further be dispersed within the polymer matrix. Advantageously, the reinforcement provides improved mechanical properties, particularly tribological properties such as wear resistance. In further embodiments, solid state lubricants may also be added to the polymer matrix of the first coating composition in order to provide a selected coefficient of friction to the coatings.

In certain embodiments, the second coating comprises a solid lubricant dispersed within a mixture of an epoxy resin and solvent. Additional additives, such as adhesion promoters and polymer modifiers, may be further added to each of the first and second coating compositions, as necessary. These and other objects and advantages of the present disclosure are discussed in greater detail below.

FIG. 1 illustrates a first pipe 100 and a second pipe 104. The pipes 100, 104 possess complementary threaded extremities which, when coupled together, form a joint 110. The joint 110 thus comprises the first pipe 100 provided with a thread 102 on an external surface, referred to as the "pin" or "pin member," and the second pipe 104 provided with a thread 106 on an interior surface, referred to as the "box" or "box member." The box member 104 is generally a pipe or a sleeve, depending on the type of joint 110. The thread 102 of the pin member 100 is adapted to mate with the thread 106 of the box member 104.

Figure 2B:
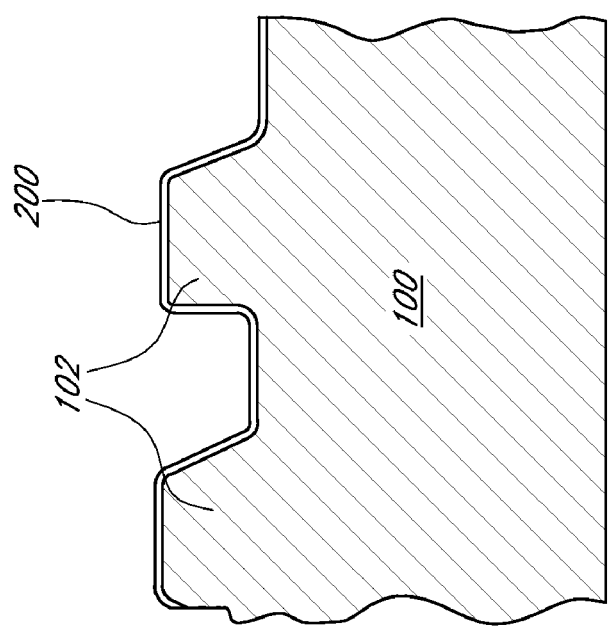
FIGS. 2A and 2B are cross sectional views of the pin and box members of FIG. 1, demonstrating the first and second coating systems deposited on the incipient mating surfaces of the pin and box in order to provide at least corrosion protection.
Figure 2A:
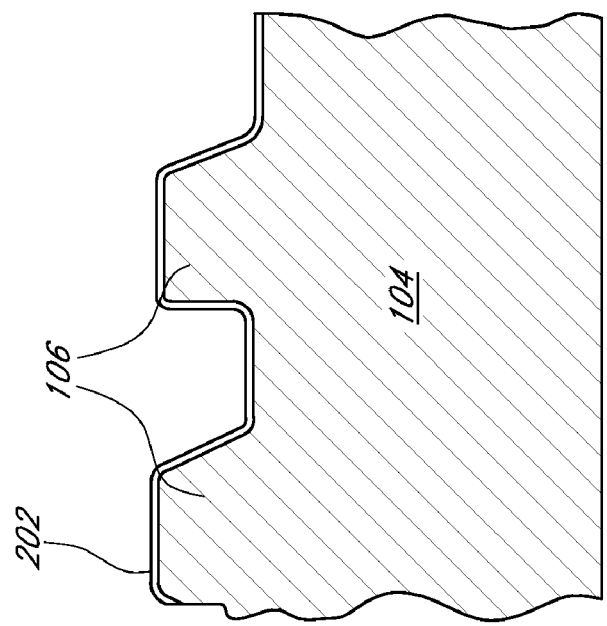

An enlargement of the threads 102, 106 of the pin member 100 and box member 104 is illustrated in FIGS. 2A, 2B. In certain embodiments, the first coating composition 200, which provides at least corrosion resistance, and optionally lubrication, is deposited on at least a portion of at least one of the pin and the box members 100, 104. In an embodiment, the first coating 200 is deposited upon at least a portion of the pin member 100. The second layer coating 202, when present, provides at least lubrication and is deposited upon at least a portion of at least one of the pin and the box members 102, 104. In an embodiment, the second coating composition 102 is deposited upon at least a portion of the box member 104.

It may be understood that this configuration is just one example of the configuration of the coating systems of the present disclosure. In an alternative embodiment, only the first coating composition may be utilized and is deposited on the box member 104. In other embodiments, the first and second coatings 200, 202 are deposited approximately in the area of the threads 102, 106 of the pin and box members 100, 104, respectively. In further alternative embodiments, the first and second coatings 200, 202 are deposited over at least a portion of the pin and box members 100, 104 which may or may not include at least a portion of the threads 102, 106. In further alternative embodiments, the first and second coatings 200, 202 are deposited over substantially the entire surface of the pin and box members 100, 104.

FIGS. 3A-3E illustrate embodiments of the first and second coating compositions 200, 202 of the present disclosure demonstrating selected coating configurations applied to the pin member 100 and box member 104. In certain embodiments, the first and second coating compositions 200, 202 each comprise a single layer. It may be understood that these configurations are provided as examples and should in no way limit the embodiments of the present disclosure.

Figure 3C:
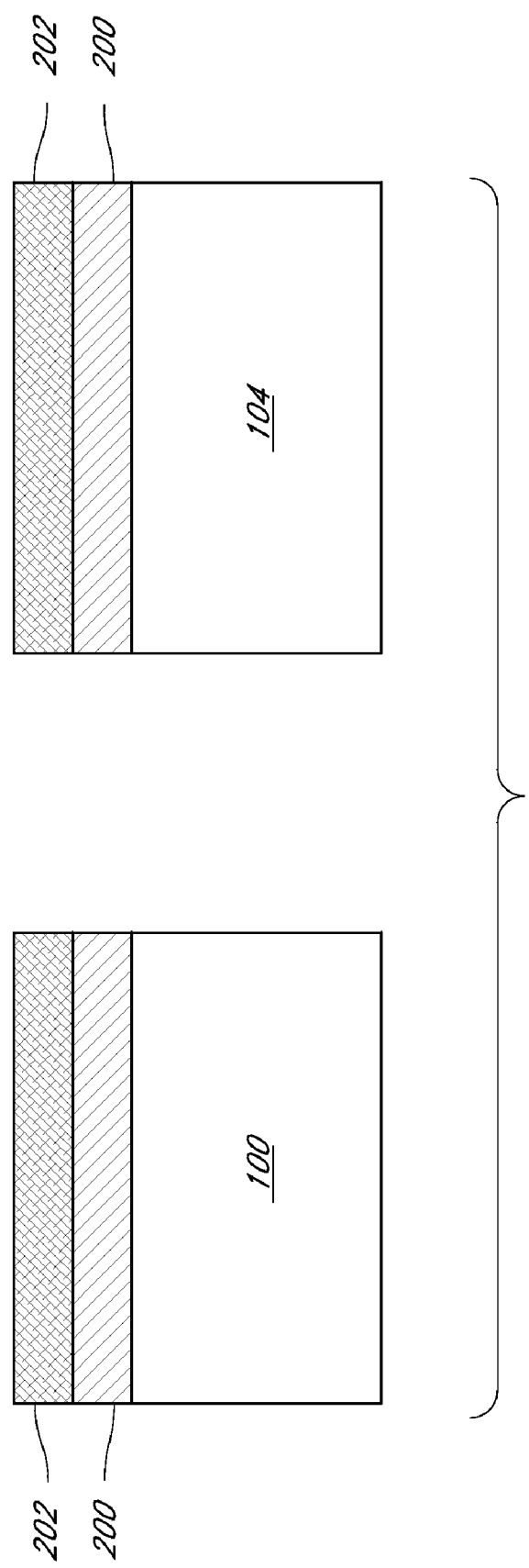

In the embodiment of FIG. 3A, the first and second coatings 200, 202 are applied as single layers to the pin 100 and box 104. For example, the first coating 200 is applied to the surface of the pin member 100 and the second coating 202 is applied to the box member 104. Alternatively, as illustrated in FIG. 3B, both coatings 200, 202 may be applied to a single surface of the threaded connections, the pin member 100 or box member 104. For example, both the first and second coatings 200, 202 may be applied to the pin member 100. In further embodiments, illustrated in FIG. 3C, both of the first and second coatings 200, 202 may be applied to each of the pin and box members 100, 104.

In additional embodiments, multiple coatings may be layered upon the surfaces adjacent the joint. For example, as illustrated in FIG. 3D, the first coating composition 200 may be present as a first and a third layer on the pin member 100, while the second coating composition 202 may be present as a second layer on the pin member 104.

In further embodiments, the thickness of the first and second coatings 200, 202 may be varied with respect to each other. For example, as illustrated in FIG. 3E, the first coating composition 200 may be thicker than the second coating layer 202.

It may be understood that these configurations illustrated above may be modified as necessary. For example, the coatings may be moved from the pin member 100 to the box member 104 and vice versa. Alternatively, the position of the first and second coating compositions 200, 202 may be swapped. Furthermore, additional layers may be provided according to the embodiments described herein.

The thickness of the coatings may be varied, as necessary. For example, the thickness of each of the first and second coating compositions 200, 202 may vary between approximately 1 μm and 100 μm. In certain embodiments, the thickness of each of the first and second coating compositions 200, 202 may range between about 10 to 40 μm. In other embodiments, the combined thickness of the first and second coating layers 200, 202 is less than about 80 μm. In further embodiments, the thickness of the first coating 200 is less than about 40 μm. In additional embodiments, the thickness of the second coating 202 is less than about 30 μm. In other embodiments, the first and second coatings 200, 202 possess approximately equal thickness.

The first and second coatings 200, 202 may be deposited according to techniques generally understood in the art. For example, the pin and box members 100, 104 may be spray coated. In one embodiment, an automatic spray unit for use with cylindrical geometries may be employed (SPMA GmbH, Bissingen, Germany). Alternatively, the pin and box members 100, 104 may be dip coated. In further embodiments, techniques such as pulsed laser deposition, chemical vapor deposition, and electrochemical deposition may be employed. For deposition of multiple layers on a single pin 100 or box member 104 surface, these techniques may be repeated, as necessary. Further, these techniques may be performed singly or in combination.

Prior to deposition, in certain embodiments, the surface of at least one of the pin or box members may be subjected to a surface treatment which is designed to enhance the adhesion of the deposited coatings to the surface upon which the coatings are deposited. The treatment is further designed to enhance the quality of the joint of threaded connections so manufactured. Examples of such surface treatments include, but are not limited to, sand blasting, phosphatization, and copper plating.

In an embodiment, the polymer matrix of the first coating composition comprises a polyimide. Polyimides possess good adhesion to metals, which facilitates the corrosion resistance provided by the first coating composition. Another advantage of polyimide systems is their low water uptake, about 0.1 wt. %. Low water uptake allows the polyimides to serve as a water barrier, enhancing the corrosion resistance provided by the first coating composition. Polyimides further possess high temperature resistance, which stabilizes the tribological properties of the first coating composition during frictional sliding.

Embodiments of the polyimide may be further combined with primers to promote adhesion of the coating. Examples of suitable primers may include, but are not limited to, silane based primers and commercial epoxy based primers. The silane groups form stable complexes to the surfaces of metals, while in epoxy based primers, the adhesion results by reaction of the epoxy group with the metal surface. For example, silane based systems with glycidoxypropyltriethoxy silane (GPTES) may be utilized to stabilize the interface between polyimide coatings and metal surfaces.

In an alternative embodiment, the polymer matrix of the first coating composition comprises an epoxy. Epoxies provide excellent adhesion to polar surfaces. Furthermore, epoxies may form self curing films which do not require intensive exterior heating of the coating for densification, facilitating processing of nanocomposites incorporating these materials. In certain embodiments, laminating resin "L20" (R&G GmbH), which consists of oligomeric Bisphenol-A-Epichlorhydrine resins, may be utilized in conjunction with isophoronediamine as a hardener.

In certain embodiments, the matrix polymer of the first coating composition is modified. For example, the polymers may be modified with small amounts of fluorine containing compounds, such as reactive perfluoropolyethers. The modifier improves the barrier properties of the polymers against water penetration due to the hydrophobic character of the fluorine containing compound. In an embodiment, the perfluoropolyether chemically reacts with the polymer, forming a plurality of covalent bonds between the perfluoropolyether and the polymer. Furthermore, the perfluoropolyether may be condensable with the main matrix polymer chain. In an embodiment, the perfluoropolyether comprises Fluorolink® D10H (Solvay Solexis). This compound may alternatively be referred to as D10H herein. In certain embodiments, about 0.5 to 15 wt. % of the fluorine containing polymer modifier, on the basis of the total weight of the first coating composition, may be utilized. In other embodiments, non-reactive fluorocompounds may be used to accomplish this purpose.

In further embodiments, additional polymer modifiers may be employed. For example, the polyimide matrix may be modified with flexible polysiloxane units using polydimethylsiloxane which is aminopropyl terminated. The siloxane decreases the glass transition temperature of the polymer and, therefore, allows for mechanical stress relaxation to occur inside the coating. In certain embodiments, about 10 to 20 wt. % of the polydimethylsiloxane, on the basis of the total weight of the first polymer composition, may be employed.

In certain embodiments, the first coating composition further comprises nano-scale and/or micron-scale additives which act to improve the performance of the coating. In certain embodiments, the additive may be configured so as to promote adhesion of the coating composition to the substrate. In alternative embodiments, the additives may promote mechanical stability of the composition. In further embodiments, the additives further enhance corrosion resistance. These additives may be present singly or in any combination within the coating composition.

In an embodiment, the first coating composition comprises at least one adhesion additive. In certain embodiments, the additive comprises a microparticle or a nanoparticle. Examples of adhesion additives include, but are not limited to, zinc oxide (ZnO) and a talc. ZnO improves adhesion of the coating composition, especially in humid environments, by acting as a filler, substantially inhibiting uptake of moisture by the polymer matrix. In other embodiments, the adhesion additive comprises a talc, such as Microtalc® AT1. Owing to its platelet-like structure, the talc improves adhesion of the coating composition by also acting as a barrier, similarly inhibiting the uptake of water into the polymer matrix. Beneficially, the zinc oxide may also enhance the corrosion resistance of the coating, as discussed below. In certain embodiments, ZnO additives having a mean diameter of between about 10 nm and 100 μm may be employed. In alternative embodiments, the mean diameter of the ZnO additives range between about 10 nm to 10 μm. In further embodiments, the mean diameter of the ZnO additives range between approximately 10 nm to 300 nm. Approximately 10 to 15 wt. % of the adhesion additive, on the basis of the total weight of the first coating composition, may be utilized.

Reinforcements may also be incorporated into the polymer matrix of the first coating composition. The addition of reinforcements improves the hardness and wear resistance of the coatings, enhancing their mechanical durability. In certain embodiments, the reinforcements comprise inorganic particles. The particles may further possess mean diameters which range approximately between the micro-scale (about 1 μm to about 500 μm) and the nano-scale (1 nm to about 500 nm), respectively. In certain embodiments, the particles possess mean diameters less than about 300 nm. Advantageously, as a result of the mechanical durability imparted to the coatings by the reinforcement, the coatings require less maintenance and replacement than less durable coatings. In an embodiment, silicon carbide (SiC), titanium dioxide (TiO$_2$), aluminum oxide (Al$_2$O$_3$), or silicon dioxide (SiO$_2$) nanoparticles may be employed. In another embodiment, the surface of the reinforcement may be modified with organic functional groups. In certain embodiments, about 5 to 10 wt. % of the reinforcement, on the basis of the total weight of the first coating composition, may be utilized.

Solid state lubricants may also be added to the coating composition in order to provide the coating with a low coefficient of friction, improving its lubrication ability. This lubricating property reduces the mechanical stresses and wear experienced by mating components of the threaded connection, as well as reducing the heat generated during contact of the components. In one embodiment, the solid state lubricants comprise micron sized solids. Examples of the solid state lubricant may include, but are not limited to polytetrafluoroethylene (PTFE), High Density Polyethylene (HDPE), Graphite, and $MoS_2$. Specific formulations are discussed in the examples below. In certain embodiments, approximately 3 to 30 wt. % of the solid lubricant, on the basis of the total weight of the first coating composition, may be utilized in the coating composition.

In additional embodiments, the composition comprises corrosion inhibiting compounds. In certain embodiments, the anticorrosion compound comprises at least one of Zn, Ca, Mg, Sr, Al, phosphate functional groups, orthophosphate functional groups, borophosphate functional groups, polyphosphate functional groups, molybdate functional groups, phosphomolybdate functional groups, borosilicates, and phosphosilicate functional groups. Examples may include, but are not limited to, aluminum triphosphate, strontium zinc phosphosilicate, zinc phosphate, zinc oxide, zinc molybdate, zinc phosphomolybdate, calcium zinc molybdate, and calcium zinc phosphomolybdate, zinc aluminum orthophosphate hydrate, zinc orthophosphate hydrate, zinc molybdenum orthophosphate hydrate, zinc calcium aluminum strontium orthophosphate polyphosphate silicate hydrate, strontium aluminum polyphosphate hydrate, calcium aluminum polyphosphate hydrate, zinc calcium strontium orthophosphate silicate hydrate, zinc borate orthophosphate hydrate, calcium hydrogen phosphate, barium borophosphate, strontium borophosphate, calcium borosilicate, barium phosphosilicate, strontium phosphosilicate, and calcium phosphosilicate. In certain embodiments at least one of Heucophos® ZCP, Heucophos® ZCP-Plus, Heucophos® ZAM, Heucophos® ZAM-Plus, and Heucorin® RZ (Heubach GmbH Germany) may be utilized. These compounds may be alternatively referred to as ZCP, ZCP-Plus, ZAM, ZAM-Plus, and RZ herein. In certain embodiments, the total amount of all anticorrosion compounds is about 5 to 15 wt. % on the basis of the total weight of the first coating composition.

In other embodiments, the first coating composition may further comprise additives to enhance conductivity. For example, about 1 to 5 wt. % carbon black, where the amount is on the basis of the total weight of the first coating composition, may be utilized.

The table below illustrates selected embodiments of the relative amounts of each component present in the first coating composition:

| Sample | Epoxy (L20) | HDPE (g) | D10H (g) | ZCP (g) | ZnO - 1 μm (g) | ZnO - 50 nm (g) |
|---|---|---|---|---|---|---|
| TE60 | 25 | 1 | 0.3 | 0 | 4 | 0 |
| TE61 | 25 | 1 | 0.3 | 0 | 0 | 4 |
| TE62 | 25 | 1 | 0.3 | 0.5 | 4 | 0 |
| TE63 | 25 | 1 | 0.3 | 1 | 4 | 0 |
| TE64 | 25 | 1 | 0.3 | 2 | 4 | 0 |
| TE65 | 25 | 1 | 0.3 | 0.5 | 0 | 4 |
| TE66 | 25 | 1 | 0.3 | 1 | 0 | 4 |
| TE67 | 25 | 1 | 0.3 | 2 | 0 | 4 |
| TE68 | 25 | 1 | 0.3 | 0 | 0 | 0 |

For example, composition TE64 comprises approximately 77.4 wt. % L20 epoxy resin, approximately 3.1 wt. % HDPE and 0.9 wt. % Fluorolink® D10H as solid state lubricants, about 6.2 wt. % Heucophos® ZCP, and about 12.4 wt. % ZnO having a size of about 1 μm. TE67 comprises approximately 77.4 wt. % L20 epoxy resin, approximately 3.1 wt. % HDPE and 0.9 wt. % Fluorolink® D10H as solid state lubricants, approximately 6.2 wt. % Heucophos® ZCP, and about 12.4 wt. % ZnO having a mean diameter of about 50 nm. All percentages were on the basis of total weight of the composition.

Embodiments of the second coating composition comprise a dry film lubricant. A solid lubricant powder is dispersed within a mixture comprising a reactive epoxy resin and solvents. In certain embodiments, the lubricant powder comprises polytetrafluoroethylene (PTFE) and the solvent comprises 2-methoxy-1-methyl-ethyl acetate. In some embodiments, titanium dioxide ($TiO_2$) powder may be further added to the composition. The $TiO_2$ may be added before, after, or concurrently with the PTFE powder.

The ratio of the components may be varied, as necessary. The solid components (powders and epoxy) are present in the range of about 20-40 wt. % and the solvent present in the range of about 60-70 wt. %, where the percentages are on the basis of the total weight of the second coating composition. Of the solids, the PTFE powder is present in an amount between about 20-40 wt. %, the epoxy resin is present in an amount between about 40-60 wt. %, and the $TiO_2$ powder is present in an amount between about 5-15% of the total weight of the solid components.

In one embodiment, the second coating composition comprises:
 about 4 to 16 wt. % polytetrafluoroethylene (PTFE);
 about 8 to 24 wt. % of a reactive epoxy;
 about 1 to 6 wt. % titanium dioxide; and
 a solvent.

To provide a substantially homogeneous dispersion of the solid powders, the composition was stirred for approximately 20 minutes. The resulting resin possessed a viscosity in the range of about 28-32 s in Ford No. 4 cup at 25° C. In alternative embodiments, the resin viscosity was about 26-28 s in Ford No. 4 cup at 25° C.

In alternative embodiments, a mixture of solvents may be employed. For example, a mixture of 2-methoxy-1-methyl-ethyl acetate and xylene may be employed.

In alternative embodiments, the dry film lubricant may comprise a self lubricating film, such as a metal alloy.

EXAMPLES

Embodiments of the first and second coatings, as discussed above, may be utilized on threaded connectors. In order to evaluate the performance of the coatings, the coatings were spray coated on metal substrates and subjected to a variety of tests. Unless otherwise noted, N80 steel substrates samples were employed in the testing. Adhesion, friction coefficient, surface roughness, wear resistance, corrosion and resistance were examined in polyimide- and epoxy-matrix coatings compositions.

Corrosion testing was performed by the neutral salt spray test (SST) according to DIN 50021/ASTM B117, "Standard Practice for Operating Salt Spray (Fog) Apparatus." In general, test samples were exposed to an NaCl solution spray at specific locations and angles. The concentration of the NaCl solution may range from about 3.5 to 20% and was about 5%, unless otherwise noted. Scratches were further introduced into the coating in order to investigate how corrosion proceeds when the coating layer is damaged and the base metal is exposed.

The friction coefficient of the coating compositions was examined through pin-on-disc tribometer testing according to DIN 50324. Approximate testing parameters were P=2 N, v=10 cm/s, 10 cm/s, r=15 mm, and s=1000 m.

In certain embodiments, the surfaces of the pin and box members 100, 104 were cleaned prior to application of the coating compositions. One or more of several cleaning techniques may be utilized, as necessary.

In a first cleaning technique, the metal surfaces of the pin and box members were first washed with acetone. Next, the surfaces were cleaned in an ultrasonic bath for about 15 minutes at approximately 75° C. by using an industrial cleaning agent (Bonder T5400). The bath was followed by tap water cleaning and cleaning for about 2 minutes at about room temperature with UNIBOND HDH cleaning agent. The remaining cleaning agent was removed with tap water and the surfaces were dried for about 10 minutes at approximately 120° C.

In a second cleaning technique, the metal surfaces of the pin and box members were first washed with xylene. Next, the surfaces were cleaned in an ultrasonic bath for about 15 minutes at approximately 75° C. by using an industrial cleaning agent (Bonder T5400). The bath was followed by tap water cleaning and cleaning for about 10 minutes at about 80° C. with UNIBOND HDH cleaning agent. The remaining cleaning agent was removed with tap water and the surfaces were dried for about 10 minutes at approximately 120° C. The surfaces so prepared demonstrated an average roughness ($R_a$) of about 0.61 μm, a mean roughness depth ($R_z$) of about 3.8 μm, and a peak to valley roughness ($R_{max}$) of about 4.32 μm.

In a third cleaning technique, the metal surfaces of the pin and box members were initially sand blasted. Next, the surfaces were cleaned in an ultrasonic bath for about 15 minutes at approximately 80° C. by using an industrial cleaning agent (Bonder T5400). The bath was followed by tap water cleaning and cleaning for about 5 minutes at about 60° C. with UNIBOND HDH cleaning agent. The remaining cleaning agent was removed with tap water and the surfaces were dried for about 10 minutes at approximately 120° C. It is noted that this procedure provided substantially reproducible surfaces and changes in surface roughness. The surfaces so prepared demonstrated an average roughness ($R_a$) of about 0.92 μm, a mean roughness depth ($R_z$) of about 6.09 μm, and a peak to valley roughness ($R_{max}$) of about 8.4 μm.

In alternative embodiments, the cleaning procedure comprised only sandblasting.

Examples

Polyimide Based Systems

The polyimide matrix was fabricated from 4,4'-Bis(3-aminophenoxy)diphenylsulfone (BAPPS) and pyromellitic dianhydride (PMDA) co-monomers by a polyaddition reaction in N-Methylpyrrolidone (NMP) as solvent. This monomer composition is slightly polar, arising from the phenoxy and the phenylsulfone groupings, which is beneficial for adhesion. This composition further allows the matrix material to disperse high amounts of inorganic nano-particles and lubricant particles, as necessary. Additionally, the hydroxyl group containing perfluoropolyether (Fluorolink® D10H, Solvay Solexis) was added as co-monomer to the reaction mixture. The resulting intermediate product was a polyamic acid structure with pendant perfluoropolyether side groups.

In a first trial, the uncured polyimide was mixed with SiC nanoparticles and a solid state lubricant (graphite) in the ratios shown below in Table 1. The mixtures were subsequently spray coated on the cleaned steel surfaces and cured thermally up to about 150° C.

TABLE 1

| | | | | | | |
|---|---|---|---|---|---|---|
| | Graphite/Polyimide nanocomposites | | | | | |
| Sample No. | PMDA 97% pure [g] | BAPPS 95% pure [g] | Graphite [g] | SiC [g] | D10H [g] | k [mm$^3$/ N/m] |
| TP20 | 3.8 | 8.46 | 3.5 | 0 | 0.3 | 1.20E−04 |
| TP19 | 3.8 | 8.46 | 3.5 | 0 | 0.7 | 5.65E−05 |
| TP21 | 3.8 | 8.46 | 4.95 | 0 | 0.7 | 2.12E−04 |
| TP22 | 3.8 | 8.46 | 6.5 | 0 | 0.7 | 3.98E−04 |
| TP9 | 3.8 | 8.46 | 3.5 | 0 | 1.5 | 2.48E−04 |
| TP13 | 3.8 | 8.46 | 0 | 3.5 | 1.5 | 1.41E−06 |
| TP14 | 3.8 | 8.46 | 1.75 | 1.75 | 1.5 | 5.18E−06 |
| TP15 | 3.8 | 8.46 | 2.6 | 0.9 | 1.5 | 6.78E−06 |

Example 1

Cross-Cut Tape Tests—Graphite/Polyimide Compositions

The cross-cut tape test was used to characterize the adhesion of the coating according to ASTM D3359-02, "Standard Test Methods for Measuring Adhesion by Tape Test". According to the standard, a bladed cutting tool is used to make the cross-hatch cuts in the coating deposited on the substrate. Subsequently, an adhesive tape is placed over the cut surface and then peeled off. If parts of the coating remain on the tape, the coating's adhesion is determined to be insufficient.

The classification of test results is done by a visual comparison with the Standard, which defines the affected area of the test section in terms of the percentage of the coating which is detached from the surface by the pull-off tape. A rating of 0 through 5 classifies the adhesion of the test sample section from 100% pass (0) to fail (5), where more than 65% of the test area delaminates from the surface.

Figure 4:
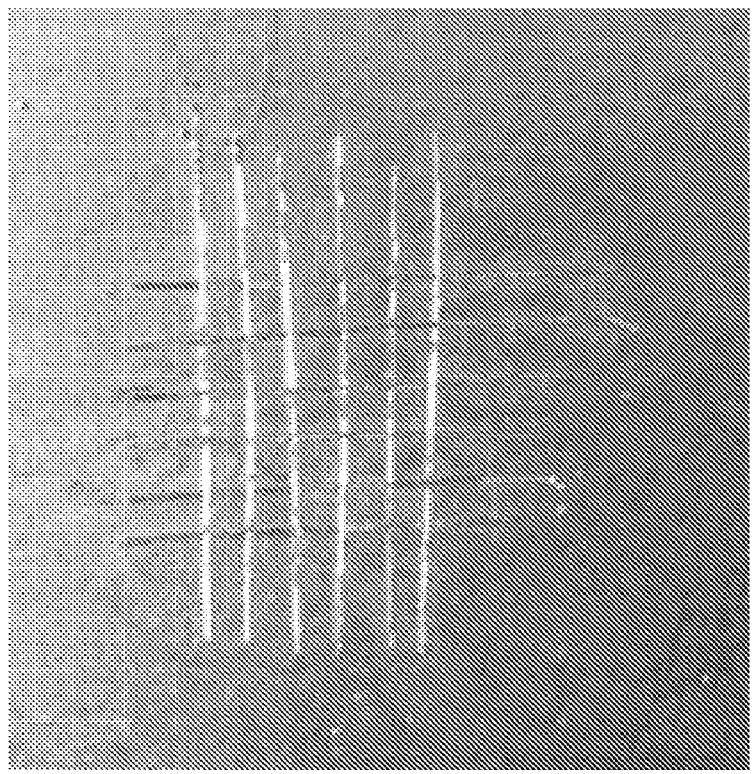
FIG. 4 is a photograph of a crosscut tape test of one embodiment of a polyimide based coating system using graphite as a solid state lubricant, illustrating that the coating system provides excellent adhesion to the substrate.

The Cross Cut Tape Test showed good adhesion (cc/tt 0/0) for the coating compositions presented in Table 1. FIG. 4 shows a photograph of a representative example initially examined for adhesion. The image illustrates that the coating remains substantially adhered to the substrate.

Example 2

Tribological Characterization—Graphite/Polyimide Nanocomposites

The influence of the solid state lubricants and the reinforcement on the friction and wear of the nanocomposite was examined through pin-on-disc tribometer testing according to DIN 50324. Approximate testing parameters comprised P=2 N, v=10 cm/s, 10 cm/s, r=15 mm, and s=1000 m. Coating systems TP9, TP13, TP14, and TP15 were investigated, each having approximately equal amounts of D10H, about 1.5 g. Notably, the TP9 sample lacks the SiC reinforcement.

Figure 5:
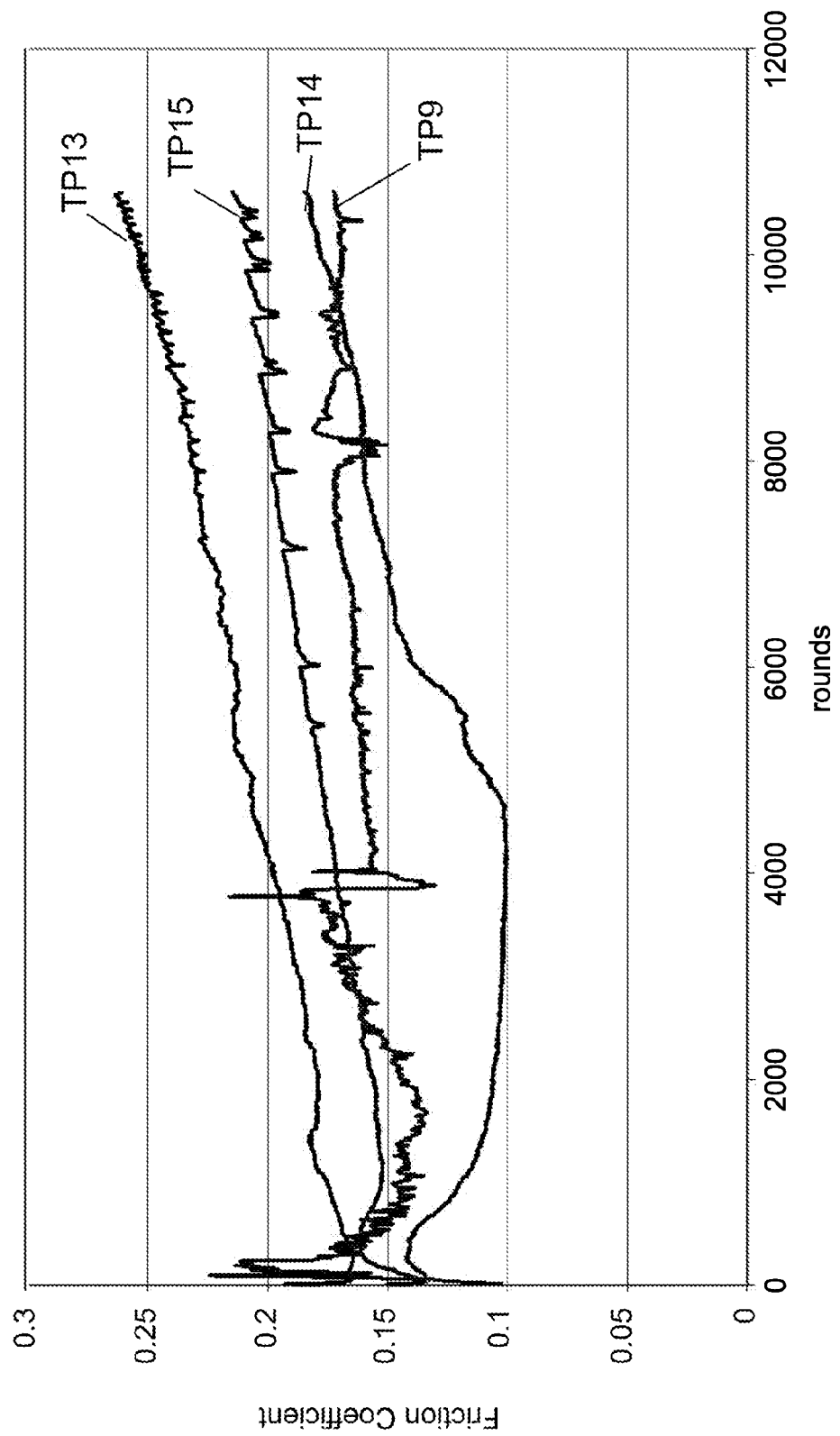
FIG. 5 is a graph plotting friction coefficient as a function of rounds for embodiments of polyimide matrix coatings having varied ratios of graphite to SiC.

The results of the pin-on-disc testing are presented in FIG. 5 and summarized in Table 1 above, where k is the wear resistance. From FIG. 5 it can be derived that, with graphite as solid state lubricant, coefficients of friction in the ranged of $\mu=0.1$-$0.2$ were obtained. The measured wear coefficients were found to be around k=$2.5*10^{-4}$ mm$^3$/Nm. The low wear resistance for graphite containing coatings is believed to be caused by the intrinsic softness of graphite, which results in a decrease of stiffness of the coatings. The addition of graphite and SiC in a ratio of about 1:1 (composition TP14) show that the wear resistance is improved, and the friction behavior was also slightly improved.

Example 3

Surface Roughness—Graphite/Polyimide Coating Systems

An important tribology topic is the question of how the surface roughness influences the friction behavior. As friction and wear are generally concurrent processes, wear debris generally starts developing from the point when a sliding process occurs on a surface. These debris increase the friction coefficient dramatically and, therefore, it is important that they are removed away from the sliding path. This removal is done by the collection of the debris in the depressions of the surface roughness. Since wear depends also on the surface roughness, with rough surfaces producing more wear debris than smooth surfaces, there may be determined a range of surface roughness which substantially optimizes the wear/friction balance. This effect can be seen in the surface with the lowest friction coefficient.

Figure 6:
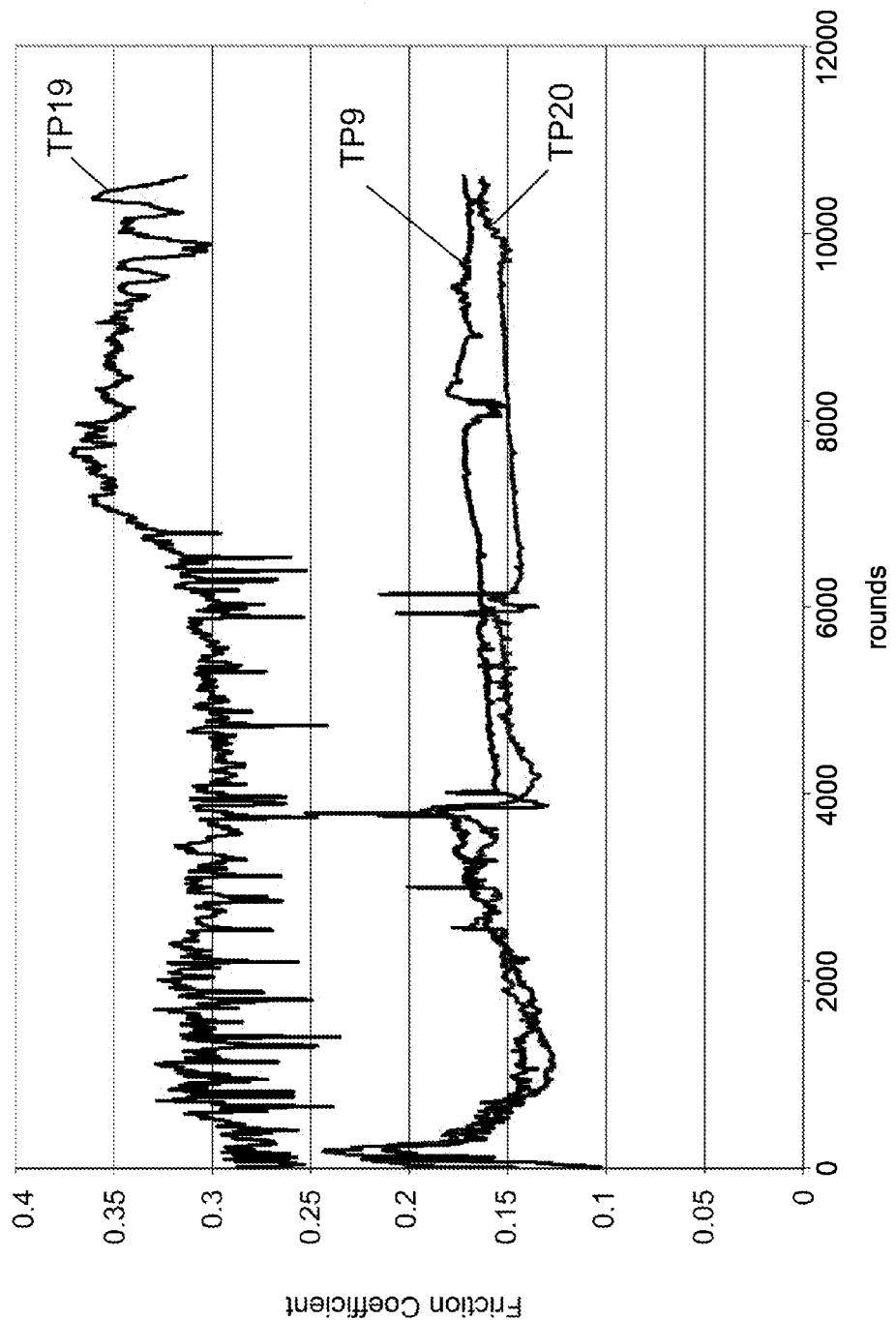
FIG. 6 is a graph plotting friction coefficient as a function of rounds for embodiments of polyimide matrix coating compositions containing graphite and having varied concentration of polymeric carbon fluorinated alcohol (D10H)

In the polyimide system, the surface roughness is modified and substantially optimized by using the polymeric carbon fluorinated alcohol (D10H). D10H acts like a surfactant, enriching the surface of the resulting polyimide coating because of thermodynamic reasons. The result is a reduction in surface free energy, which can be used to vary the roughness of the surface. Table 2 and FIG. 6 show the dependence of the friction coefficient on the surface roughness.

TABLE 2

Influence of D10H on the surface roughness of graphite/polyimide coating systems.

| Sample No. | PMDA 97% pure | BAPPS 95% pure | Graphite [g] | D10H [g] | Ra [μm] |
|---|---|---|---|---|---|
| TP9 | 3.8 | 8.46 | 3.5 | 1.5 | 0.29 |
| TP19 | 3.8 | 8.29 | 3.5 | 0.7 | 0.17 |
| TP20 | 3.8 | 8.29 | 3.5 | 0.3 | 0.31 |

From FIG. 6, it can be derived that the coefficient of friction changes by more than about 100%, depending on the surface roughness of the samples. In one embodiment, an optimum surface roughness for the polyimide systems, with respect to a low coefficient of friction, is about Ra=0.3 μm. This is achieved by the use of about 8.5 wt. % Fluorolink® D10H in the polymer matrix. Additionally, it should be mentioned that besides the concentration of fluorinated alcohol, the surface roughness also depends on the volume fraction of lubricant in the matrix. In order to prepare comparable matrix systems, the concentration of perfluoropolyether has been kept approximately constant with respect to the unreinforced matrix.

Example 4

Tribological Characterization—MoS$_2$/Polyimide Coating Systems

The wear and friction behavior of embodiments of coating systems incorporating a second type of solid state lubricant, MoS$_2$ was also investigated. Table 3 shows the compositions of the polyimide systems containing MoS$_2$ as lubricant, and the corresponding wear coefficients from the friction experiments. Unless otherwise noted, the matrix material comprised the polyimide.

TABLE 3

Wear testing results for MoS$_2$/SiC coating systems

| Sample No. | PMDA 97% pure | BAPPS 95% pure | MoS$_2$ [g] | SiC [g] | D10H [g] | k [mm$^3$/Nm] |
|---|---|---|---|---|---|---|
| TP30 | 3.8 | 8.29 | 3.5 | 0 | 1.5 | 2.98E−04 |
| TP31 | 3.8 | 8.29 | 1.75 | 0 | 1.5 | 5.18E−05 |
| TP32 | 3.8 | 8.29 | 0.9 | 0 | 1.5 | 2.36E−06 |
| TP41 | 3.8 | 8.29 | 3.1 | 0.4 | 1.5 | 4.88E−04 |
| TP33 | 3.8 | 8.29 | 2.6 | 0.9 | 1.5 | 2.36E−06 |
| TP34 | 3.8 | 8.29 | 1.75 | 1.75 | 1.5 | 1.17E−05 |
| TP35 | 3.8 | 8.29 | 0.9 | 2.6 | 1.5 | n.d. |
| TP36 | 3.8 | 8.46 | 3.5 (HDPE) | 0 | 1.5 | n.d. |
| TP13 | 3.8 | 8.46 | 0 | 3.5 | 1.5 | 1.41E−06 |
| TP44 | 3.8 | 8.46 | 3.5 | 0 | 0.7 | 7.72E−04 |
| TP45 | 3.8 | 8.46 | 3.5 | 0 | 0.3 | 2.64E−03 |

Figure 7:
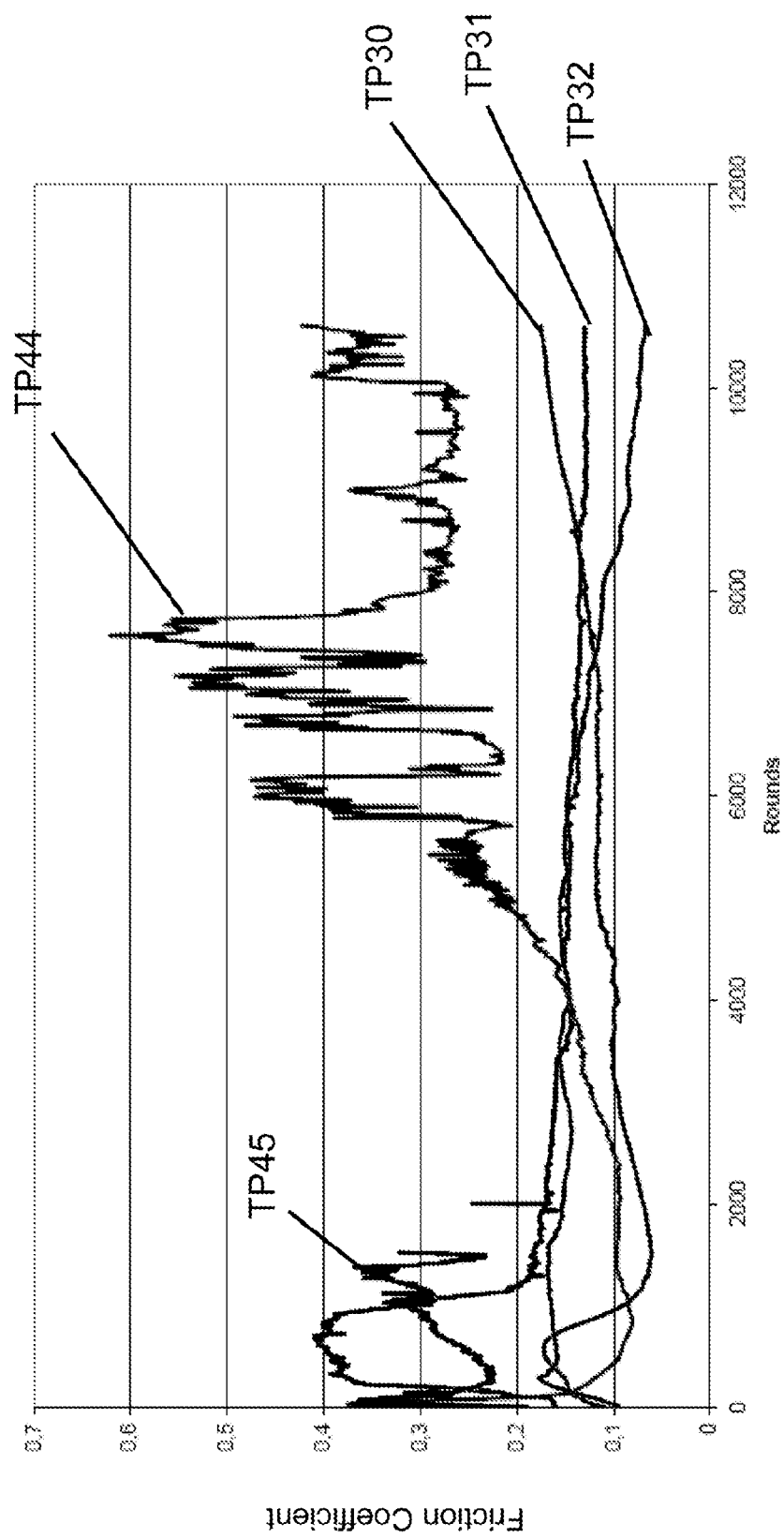
FIG. 7 is a graph plotting friction coefficient as a function of rounds for embodiments of polyimide matrix coatings having varied concentration of $MoS_2$ and D10H.

FIG. 7 shows the corresponding dependence of the friction coefficient on the number of sliding rounds for polyimide systems containing only MoS$_2$ without the SiC nanoparticles (TP30, PT31, PT32, TP44, and TP45). MoS$_2$, compared with graphite as lubricant, shows approximately the same behavior according to the testing parameters. In the case of graphite, a concentration of about 8.5 wt. % of perfluoropolyether (compositions TP30, TP 31, TP 32) was found to be an optimum for the friction behavior.

To investigate the influence of the SiC nanoparticles on the tribological properties, different ratios of MoS$_2$ to SiC were used in the matrix and the coatings were characterized. The results of this characterization are presented in FIG. 8.

For MoS$_2$ containing compositions, the addition of SiC only showed a substantial effect on the wear resistance, while the friction coefficient was nearly the same as for the coatings without SiC. This can be better observed on the comparison presented in FIG. 11, discussed in detail below.

Figure 8:
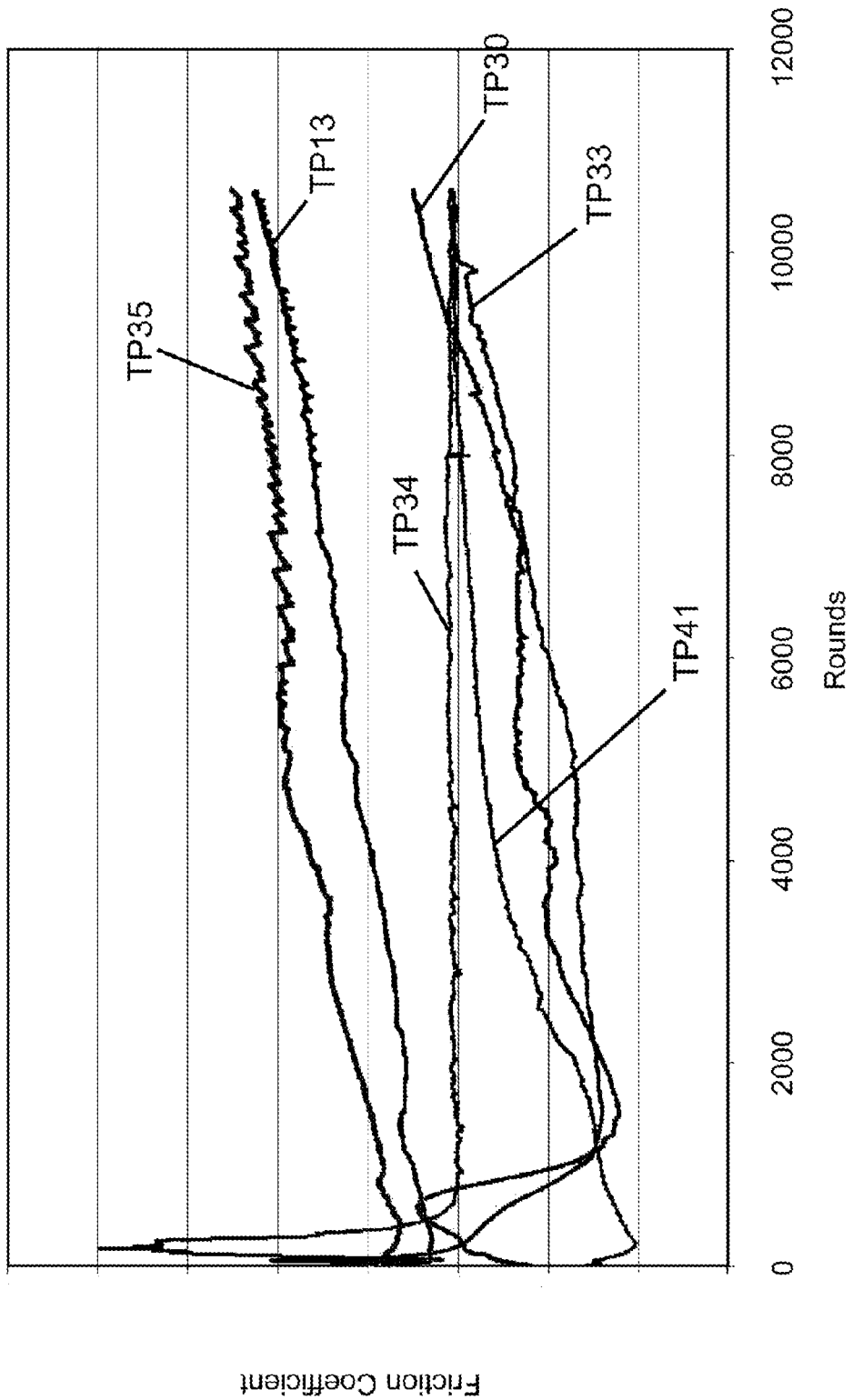
FIG. 8 is a graph plotting friction coefficient as a function of rounds for embodiments of polyimide matrix coatings having varied ratios of $MoS_2$ and SiC.

On the other hand, as further illustrated in FIG. 8, a relatively low friction factor, less than about 0.1, was observed in some coatings at up to about 4000 cycles (rounds). This tendency was also noticed in FIG. 9, with the PTFE/SiC systems after about 2500 cycles.

Example 5

Tribological Characterization—PTFE Lubricants

Figure 9:
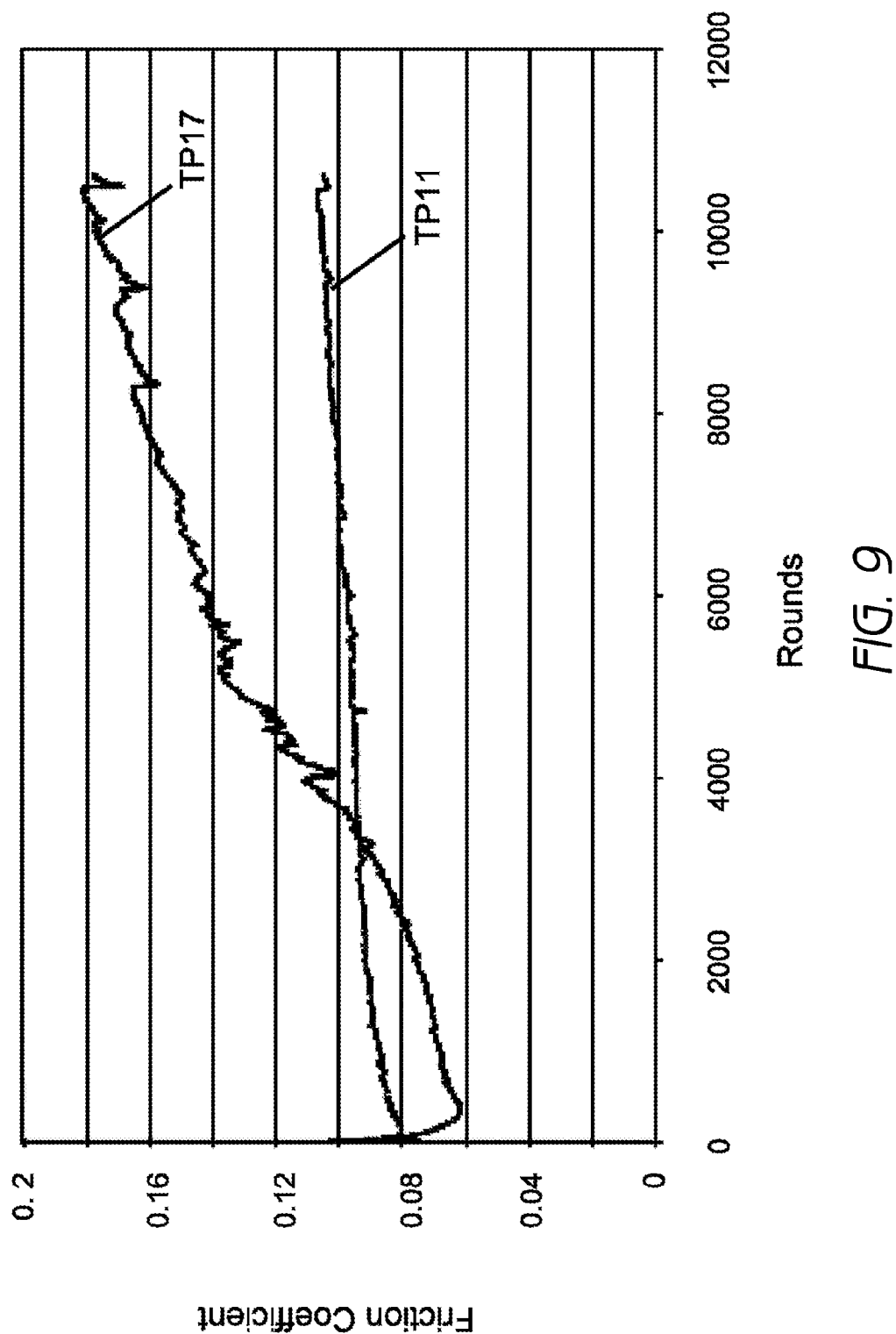
FIG. 9 is a graph plotting friction coefficient as a function of rounds for embodiments of polyimide matrix coatings having varied concentration of PTFE and SiC.

To obtain lower friction values, polymer based solid state lubricant additions to the coating system were investigated. Table 4 and FIG. 9 present selected experiments with PTFE and PTFE/SiC.

TABLE 4

Wear Testing Results for PTFE/SiC coating systems

| Sample No. | PMDA 97% pure | BAPPS 95% pure | PTFE [g] | SiC [g] | D10H [g] | k [mm3/N/m] |
|---|---|---|---|---|---|---|
| TP11 | 3.8 | 8.46 | 3.5 | 0 | 1.5 | 7.07E–04 |
| TP17 | 3.8 | 8.46 | 1.75 | 1.75 | 1.5 | 2.35E–06 |

The behavior of PTFE (TP11) and PTFE/SiC (TP17) was substantially opposite that of the graphite and MoS$_2$ coatings discussed above. In the case of PTFE, the addition of SiC significantly improved the wear coefficient but, also, dramatically increased the friction coefficient.

Example 6

Tribological Characterization—Polyimide/HDPE Lubricants

Figure 10:
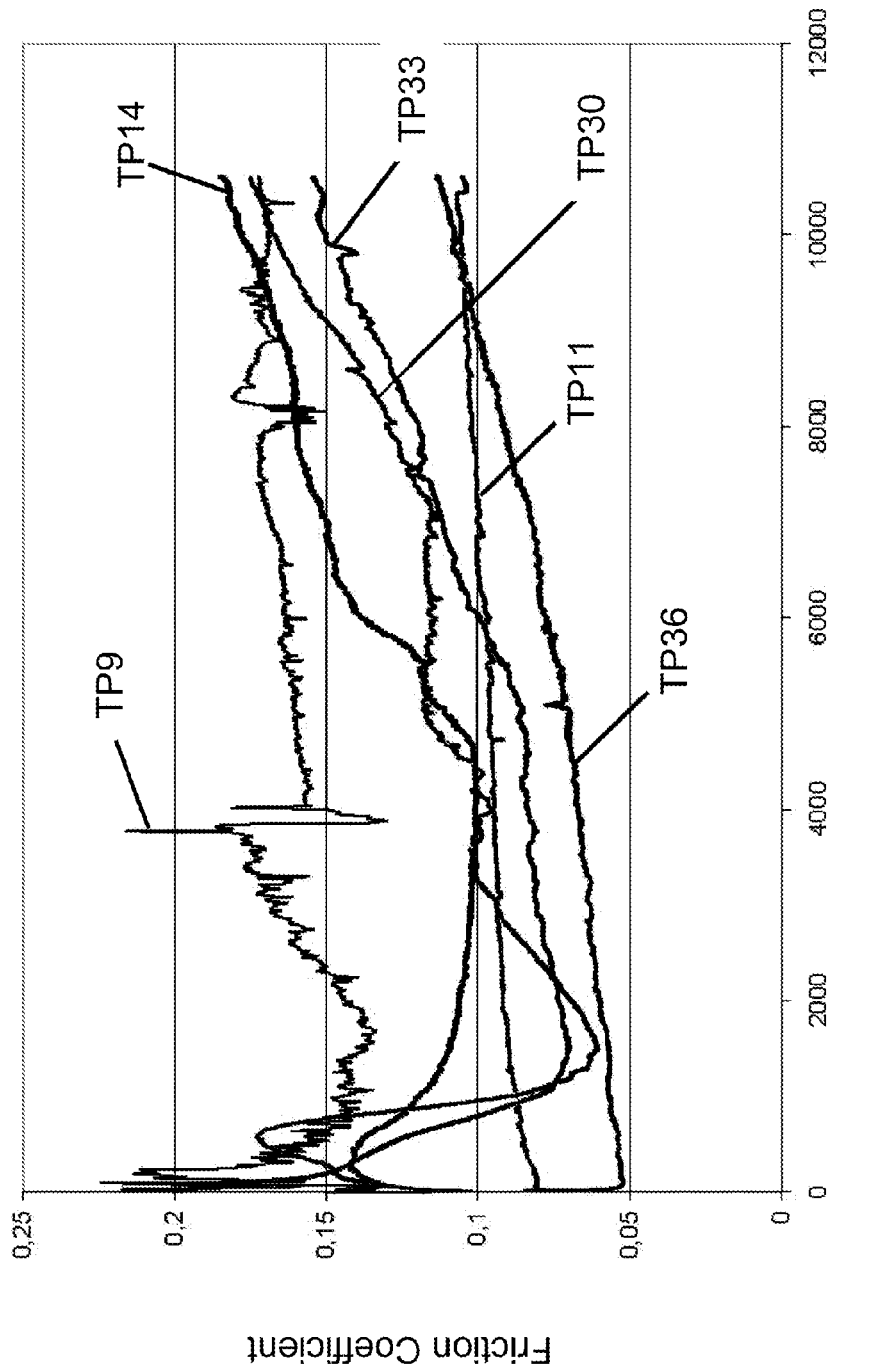
FIG. 10 is a graph plotting friction coefficient as a function of rounds for embodiments of polyimide matrix coatings containing D10H and having different solid state lubricants (TP9: graphite, TP11: PTFE, TP30: MoS2, TP36: HDPE, TP33: MoS2/SiC, TP14: graphite/SiC)

One characteristic of the polyimide systems is their relatively high curing temperature, which may result in phase separation when HDPE is utilized as polymeric lubricant. This coating was synthesized (composition shown in Table 3, TP36) and this system demonstrated lowest friction coefficient of the compositions discussed up to this point (FIG. 10).

However, the coating system synthesized with HDPE does exhibit phase separation, which may be detrimental to the corrosion resistance properties of the coating system.

Example 7

Figure 11:
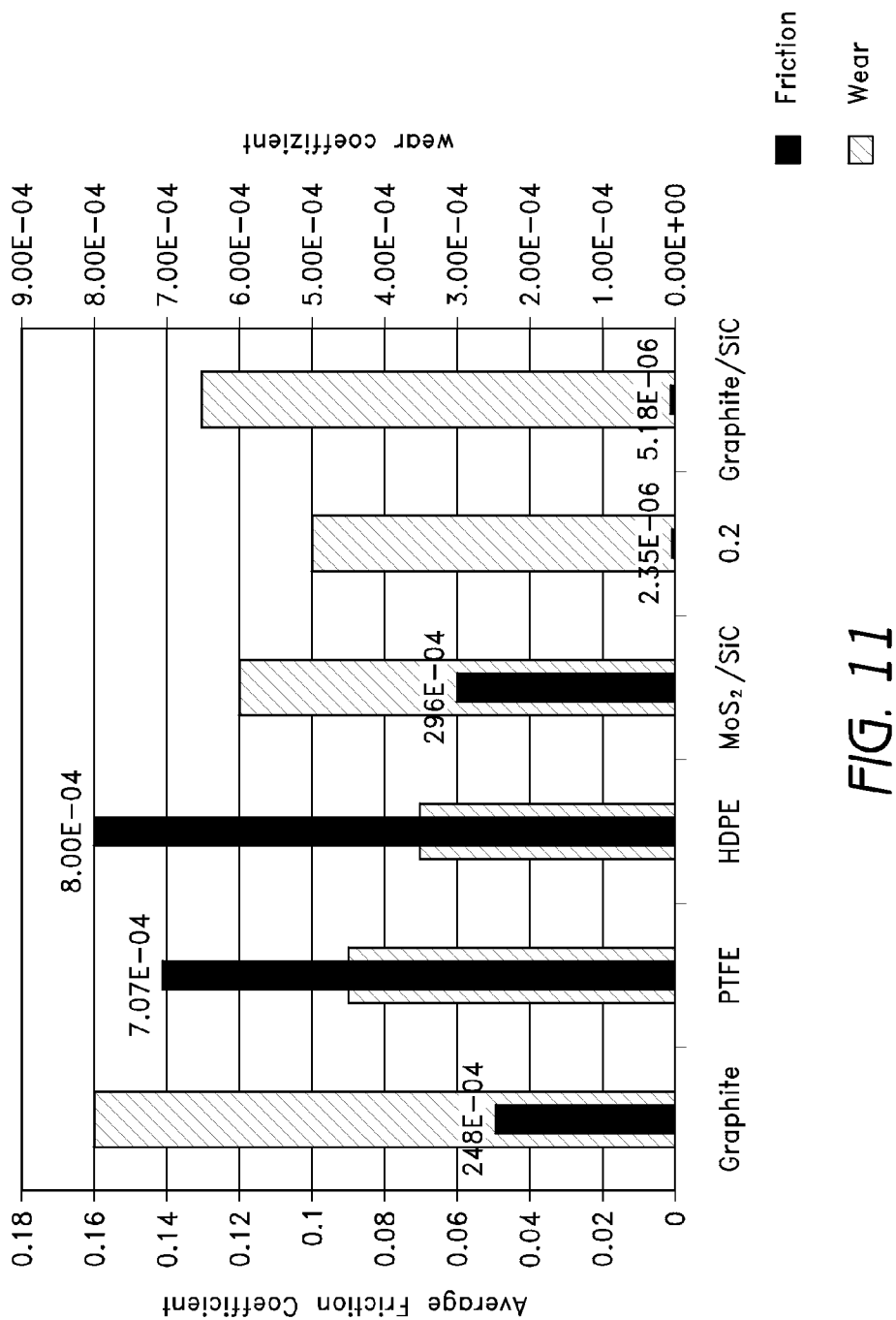
FIG. 11 is a histogram of average friction coefficient and wear coefficient as a function of lubricant for embodiments of polyimide matrix coatings having different solid state lubricants.

Comparison of Tribological Properties of Polyimide Coating Systems Having Different Lubricants A comparison of the friction and wear behavior of coating compositions having different solid state lubricants is shown in FIG. 11. The investigations of the friction behavior of the selected solid state lubricants showed, in one embodiment, that the lowest friction was obtained by using HDPE and PTFE as lubricants (FIG. 10). Compositions comprising more than about 20 wt. % of solid state lubricant were tested in the pin-on-disc test, due to the fact that a polymer coating also contains about 8.5 wt. % D10H and a content of about 30 wt. % filler. Higher amounts of solids resulted in substantially brittle coatings, which could not be subjected to friction experiments. The addition of SiC, as hard filler to the coating, improved the wear resistance significantly. In the case of graphite, the addition of SiC also showed positive effects on the friction behavior of the samples (FIG. 10, FIG. 11).

Example 8

Corrosion Testing of Polyimide-Based Coating Systems

Figure 12:
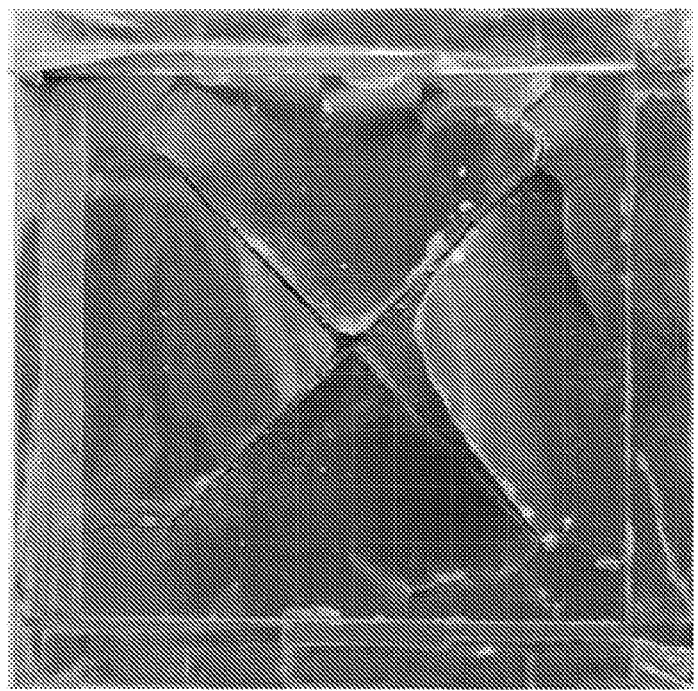
FIG. 12 is a photograph of one embodiment of a delaminated polyimide coating, without primer (composition TP30), after an approximately 70 h neutral salt spray test (SST)

To investigate the corrosion protection properties of the polyimide coatings, all coatings were subjected to SST for approximately 500 h, according to DIN 50021/ASTM B117. These experiments demonstrate that the interface between the polyimide matrix and the metal substrate is very sensitive for hydrolysis. All polyimide coatings which were applied directly on the cleaned steel surface delaminated after about 70 h of SST. A representative illustration of this delamination is shown in FIG. 12.

Figure 13:
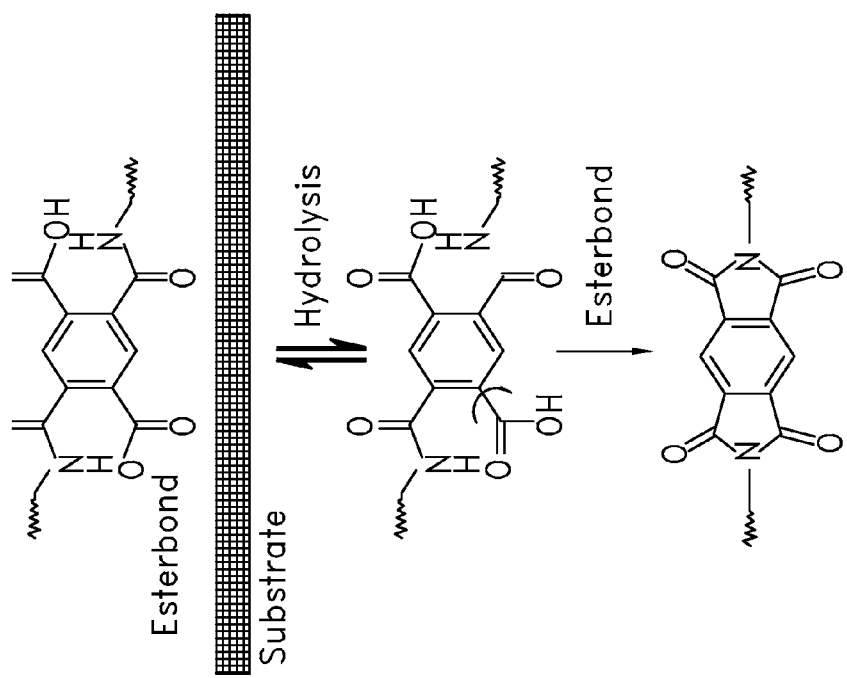
FIG. 13 illustrates the mechanism of the hydrolyzation Polyimide/Metal interface layer.

A reason for the sensitivity against hydrolysis and the delamination might be explained by the fact that the adhesion of the polyimides is based on the formation of ester bonds between the polymer layer and the metal surface. The origin of these ester groups can be polyamide acid, which is used as precursor for the polyimide system. These ester bonds are possible sites for hydrolysis, leading to imidisation, which can result in the loss of adhesion (FIG. 13).

To address this problem, a stabilization of the interface to the metal can be performed by the use of appropriate primers, or a modification of the polyimide matrix itself, in order to obtain different stable anchor groups on the surface. Isocyanates form complexes with metal surfaces and a modification of the ester surface groups by reaction with diisocyanates to obtain isocyanate anchor groups. This type of matrix modification was examined in trial tests but was not found to solve the delamination problem.

Figure 14:
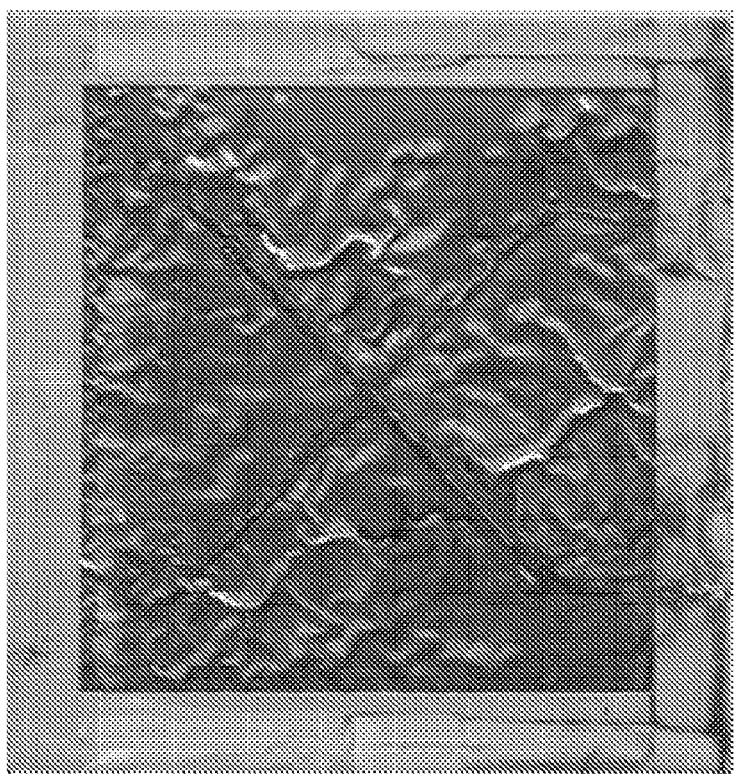
FIG. 14 is a photograph of an embodiment of polyimide coating composition TP9 after an about 500 h SST. A glycidoxypropyltriethoxy silane (GPTES) primer is present between the coating and the substrate.

To improve the adhesion of the polyimide coatings, two different primer systems were tested: (a) silane based primers, where the silane groups form stable complexes to the metal surface and (b) commercial epoxy based primers where the adhesion results by reaction of the epoxy group with the metal surface. The silane based systems with GPTES (glycidoxypropyltriethoxy silane) are expected to stabilize the interface between the polyimide coating and the metal substrate surface. Based on the results of the SST, it can be concluded that the GPTES primer system itself tends to be sensitive for hydrolysis, which results in a delamination after 500 h SST (FIG. 14).

Figure 15B:
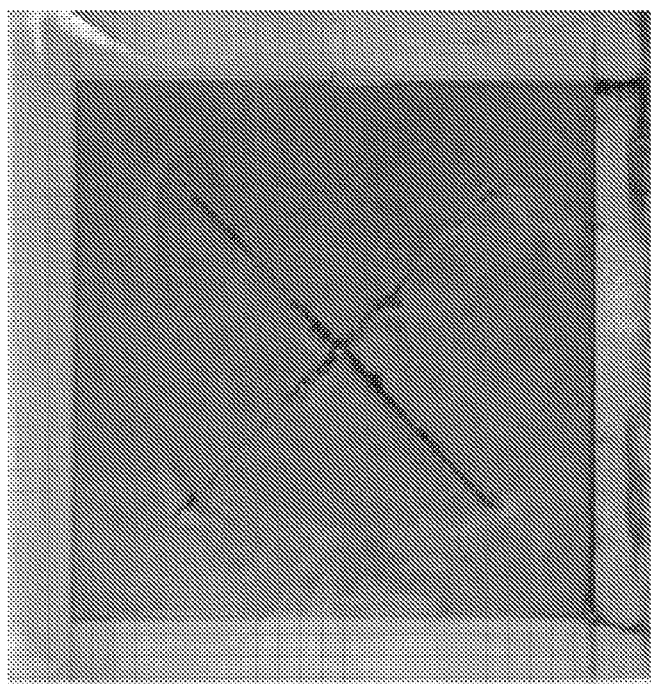
FIGS. 15A and 15B are photographs of an embodiment of polyimide coating composition TP14 with commercial epoxy primer; (15A) after an approximately 300 hour salt spray test; (15B) after an approximately 500 h salt spray test.
Figure 15A:
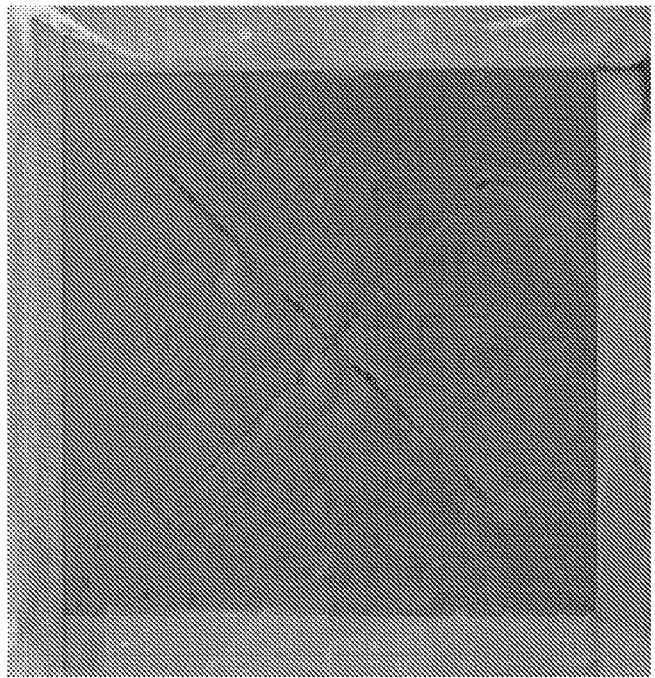
Figure 16B:
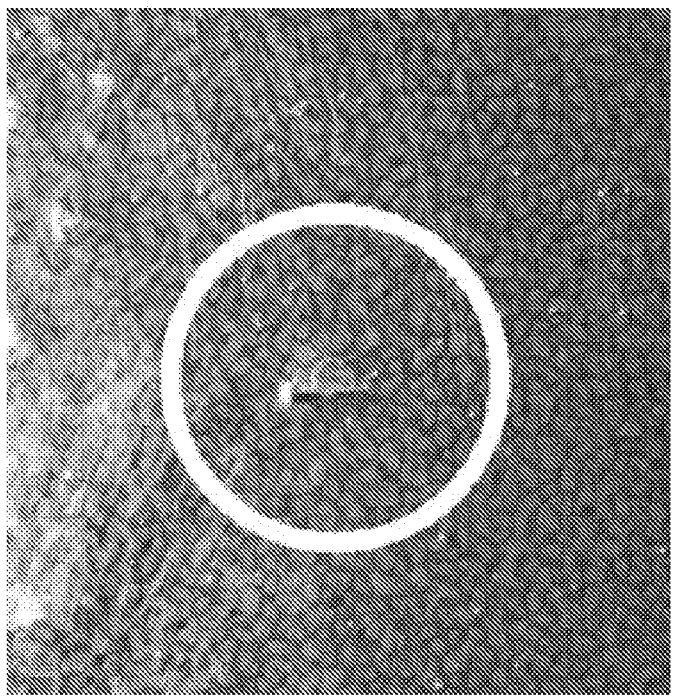
FIGS. 16A and 16B are photographs of an embodiment of polyimide coating composition TP30 with commercial epoxy primer; (16A) after an approximately 500 h SST (16B) close up view of 16A, illustrating an open blister on the coating surface.
Figure 16A:
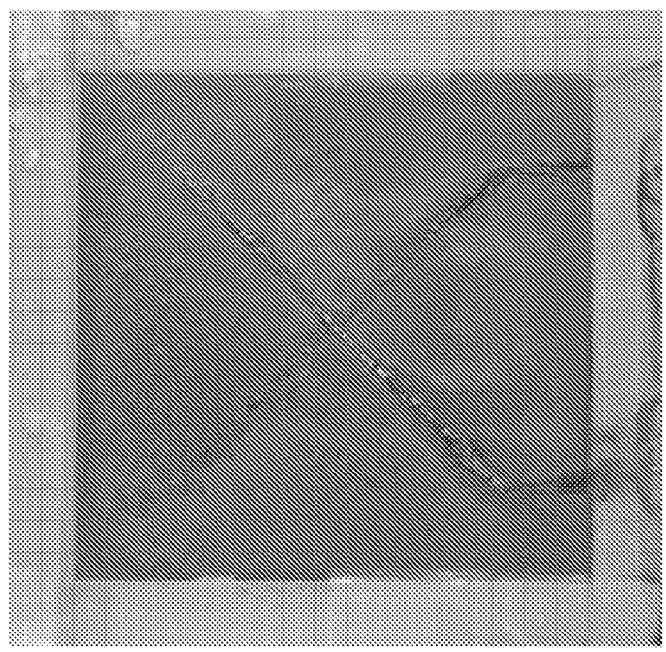

With epoxy based primers, the following results were achieved (FIGS. 15A, 15B and FIG. 16A). Compared to the GPTES primer (FIG. 14), the use of the epoxy primer leads to an increase in adhesion. Furthermore, after about 300 h of SST (FIG. 15A), as well as about 500 h of SST (FIG. 15B), the polyimide system with MoS$_2$/SiC (TP30) and graphite/SiC (TP14) respectively, showed substantially no delamination close to the scratches. On both samples, only small blistering was detected (for example, FIG. 16B).

At least one difference between the graphite/SiC (TP14) and MoS$_2$/SiC (TP30) coatings was the blisters of the MoS$_2$/SiC coating which were smaller than those in the graphite/SiC coating.

Figure 17B:
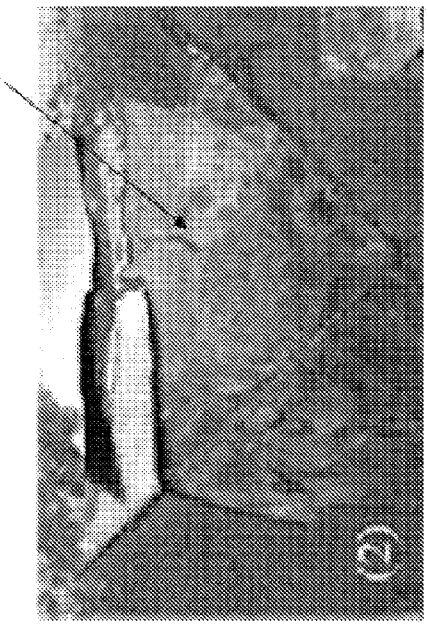
FIGS. 17A-17C are photographs of an embodiment of polyimide coating composition TP30 after an approximately 500 h SST, illustrating peeling off of the coating; (17A) immediately after peeling the non-stuck coating—substantially no corrosion is observed; (17B) after about 10 minutes of exposure to environmental conditions, the formerly clean, exposed substrate surface shows rust; (17C) after approximately 10 additional minutes of exposure to environmental conditions, the coating on the top was removed, showing substantially no corrosion.
Figure 17A:
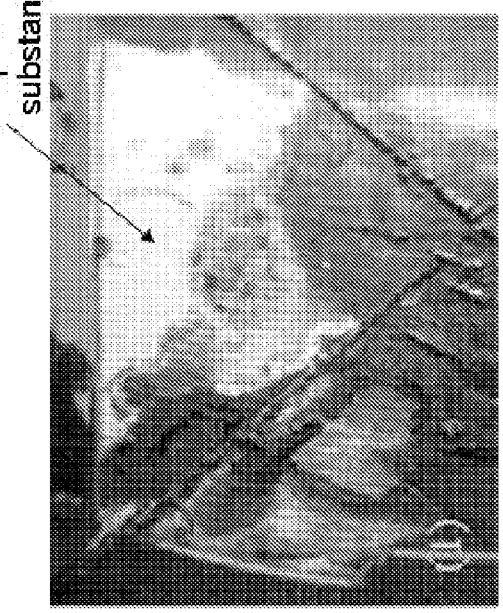
Figure 17C:
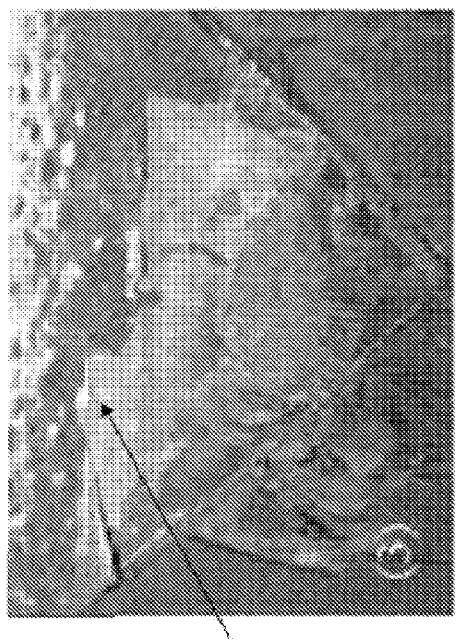

To investigate the corrosion under the blisters after passing the requirement of about 500 h SST, a blister of the MoS$_2$/SiC coating was opened manually. Under the blister there was substantially no corrosion detected on the metal surface. The same results were obtained by full peeling off the coating, with substantially no corrosion observed, corroborating the previous statement (FIGS. 17A, 17B, 17C).

From the results shown above, it may be concluded that the barrier properties of the polyimide matrix may be sufficient to at least partially inhibit the corrosion tendency, even in partially delaminated areas.

Example 9

Further Improvement of the Selected Polyimide Coating Systems

Figure 18:
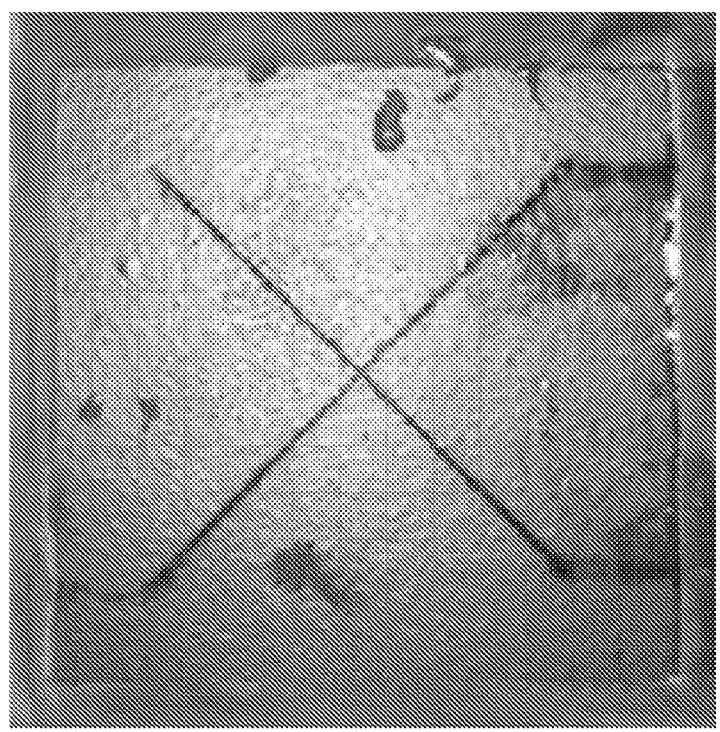
FIG. 18 is a photograph of an embodiment of coating composition TP65 after an approximately 300 h SST.

After analyzing the presence of blisters in the two most promising coating systems, it is assumed that the mechanical stress inside the coating is the main cause of blistering. A possible solution for this problem is expected to be the increase of the flexibility or the relaxation ability of the coating. This hypothesis was investigated through a modification of the polyimide matrix with flexible polysiloxane units (Polydimethylsiloxane, aminopropyl terminated, Mw about 900-1000 g/mol), in order to decrease the glass transition point and, therefore, enable mechanical stress relaxation to occur inside the coating. FIG. 18 shows the coating of this polysiloxane improved matrix (TP65) after about 300 h SST.

The coating of TP65 is the coating TP14 modified with about 1 g polydimethylsiloxane. The coating showed substantially no blistering, no corrosion and excellent adhesion.

Summary of Polyimide Coating System Coating Characterization

In one aspect, the polyimide-based coating systems exhibit promising tribological properties, as shown in the overview in the following table:

| Sample No. | Graphite [g] | MoS2 [g] | SiC [g] | μ | k [mm$^3$/N/m] |
|---|---|---|---|---|---|
| TP14 | 1.75 | 0 | 1.75 | 0.1-0.14 | 5.18E-6 |
| TP15 | 2.6 | 0 | 0.9 | 0.15-0.16 | 6.78E-06 |
| TP34 | 0 | 1.75 | 1.75 | 0.15 | 1.17E-05 |
| TP33 | 0 | 2.6 | 0.9 | 0.05-0.12 | 2.36E-06 |

In another aspect, coating systems passed the neutral salt spray test with exposure times of about 500 h with only some blisters and substantially no corrosion beneath the blister. Further work performed showed evidence that the reason for the blister appearance can be overcome.

In a further aspect, the studies performed, as described above, show that different composition parameters can be used during the further development to balance and optimize the final coating material.

Examples

Epoxy-Based Coating Systems

The polymer matrix for the epoxide systems was based on a laminating resin "L20," which consists of oligomeric Bisphenol-A-Epichlorhydrine resins. As hardener for this system, isophoronediamine, was used. Typical applications for such a resin are glass fiber reinforced products. This material was selected due to the fact that the resin has low viscosity, which should allow dispersing of inorganic fillers even in relatively high concentrations, as necessary. Epoxide systems show excellent adhesion to substantially any polar surface and should, therefore, provide improved intrinsic corrosion protection ability over the polyimide matrix-based coating systems. From this point of view, initial experiments were carried out without additional use of primers in the tribological as well as in the corrosion testing. So configured, the epoxy based coating systems are expected to provide more options to obtain improved corrosion protection compared to the polyimide systems.

Example 10

Tribological Characterization

Graphite/Epoxy Coating Systems

Figure 19:
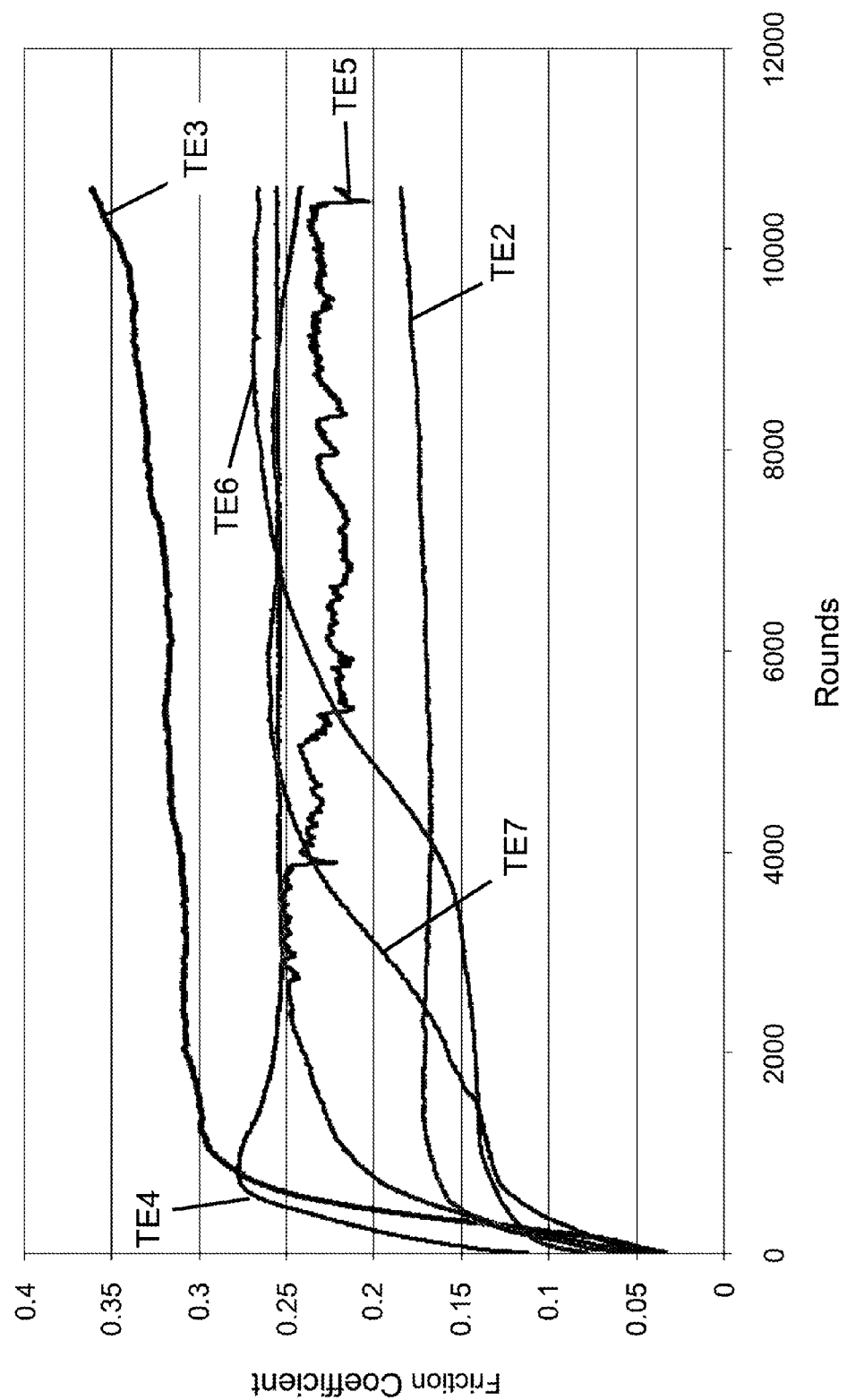
FIG. 19 is a graph plotting friction coefficient as a function of rounds for embodiments of epoxy matrix coatings having varied concentrations of graphite and D10H.

FIG. 19 and Table 5 present selected experiments performed upon epoxy-based coating compositions containing graphite.

TABLE 5

Wear testing results for Graphite/Epoxy coating systems

| Sample No. | Epoxy Resin L20 [g] | Graphite [g] | D10H [g] | k [mm$^3$/N/m] |
|---|---|---|---|---|
| TE2 | 12.5 | 1 | 0 | failure |
| TE3 | 12.5 | 2 | 0 | failure |
| TE4 | 12.5 | 3 | 0 | failure |
| TE5 | 12.5 | 2 | 1 | 2.98E-04 |
| TE6 | 12.5 | 2 | 2 | failure |
| TE7 | 12.5 | 2 | 3 | failure |

In epoxy based systems with graphite as a lubricant, results comparable to the polyimide based systems were obtained. The average friction coefficient was in the range of approximately $\mu=0.15$-$0.3$. Determination of the wear coefficient was not possible, however, because of failure of the coating layers.

Addition of D10H to the systems showed a slightly positive effect in the short term sliding process (TE5-TE6), where a coefficient of friction of about $\mu=0.1$-$0.15$ was obtained. During the test it was observed that the coating layers tended to fail after about 2000 cycles and 4000 cycles, respectively. A possible reason for this behavior may have been the lower intrinsic thermal stability of the epoxy matrix compared to the formerly investigated polyimide matrix, resulting in a thermal destruction and failure of the matrix during the friction process.

Example 11

Tribological Characterization—MoS$_2$/Epoxy Coating Systems

Figure 20:
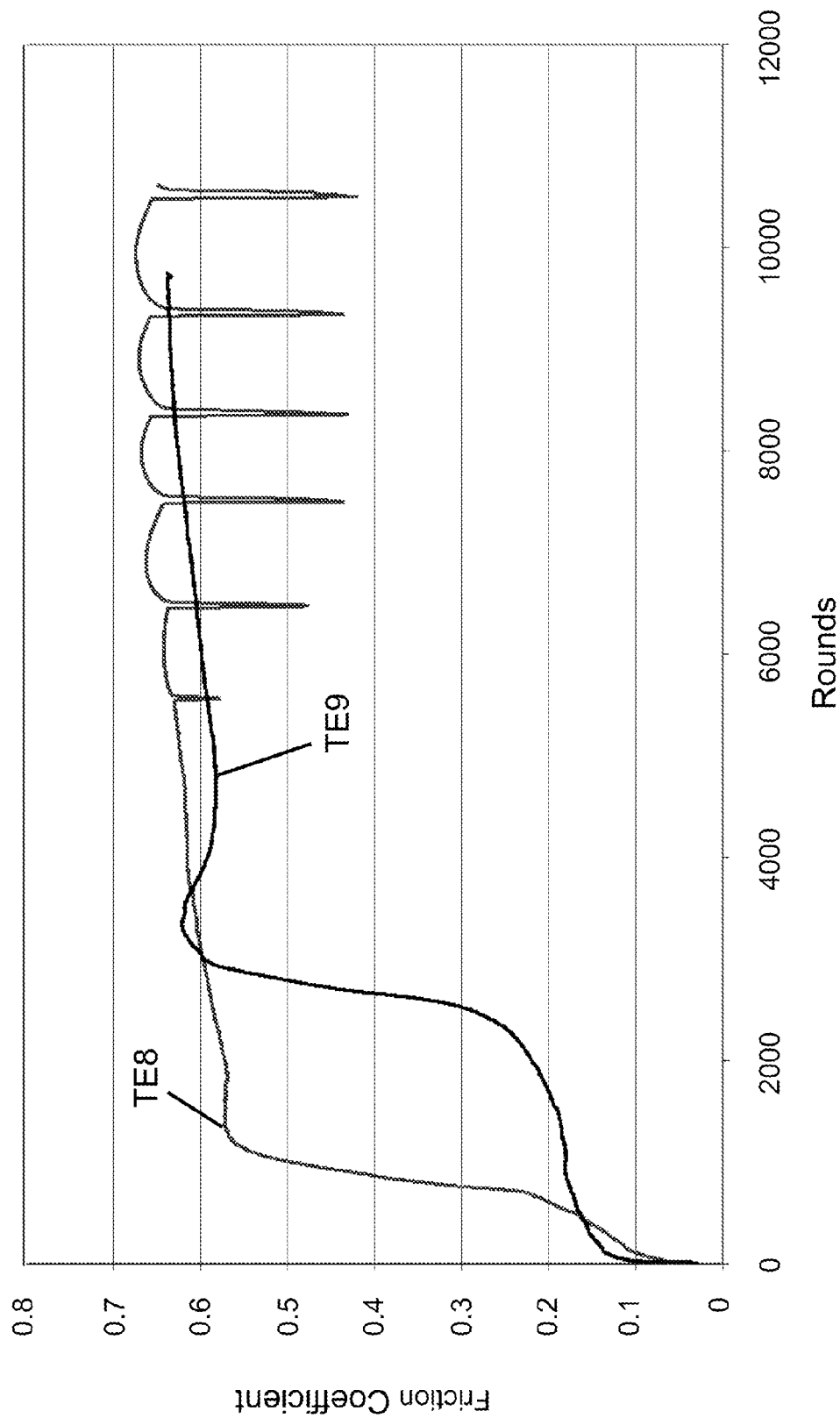
FIG. 20 is a graph plotting friction coefficient as a function of rounds for embodiments of epoxy matrix coatings having varied concentrations $MoS_2$.

MoS$_2$ as solid state lubricant in the epoxy systems was also evaluated. Table 6 and FIG. 20 show the results of characterization of epoxy-based coatings containing MoS$_2$ as solid state lubricant:

TABLE 6

Wear testing results for MoS$_2$/Epoxy coating systems

| Sample No. | Epoxy resin L20 [g] | MoS2 [g] | D10H [g] | k [mm3/N/m] |
|---|---|---|---|---|
| TE8 | 12.5 | 1 | 0 | failure |
| TE9 | 12.5 | 2 | 0 | failure |

For layers containing MoS$_2$, the average friction was measured to be approximately $\mu=0.55$ after about 1000 and 2000 cycles, respectively (FIG. 20).

MoS$_2$, in combination with the oxides formed through tribochemistry at high temperature, as lubricants when in contact with metal, play a significant role in the friction process. In the present case, it is believed that the oxides cannot be substantially formed because the epoxy based matrix softens before reaching the critical point of temperature for its formation.

Example 12

Tribological Characterization

HDPE/D10H Containing Epoxy Coating Systems

Figure 21:
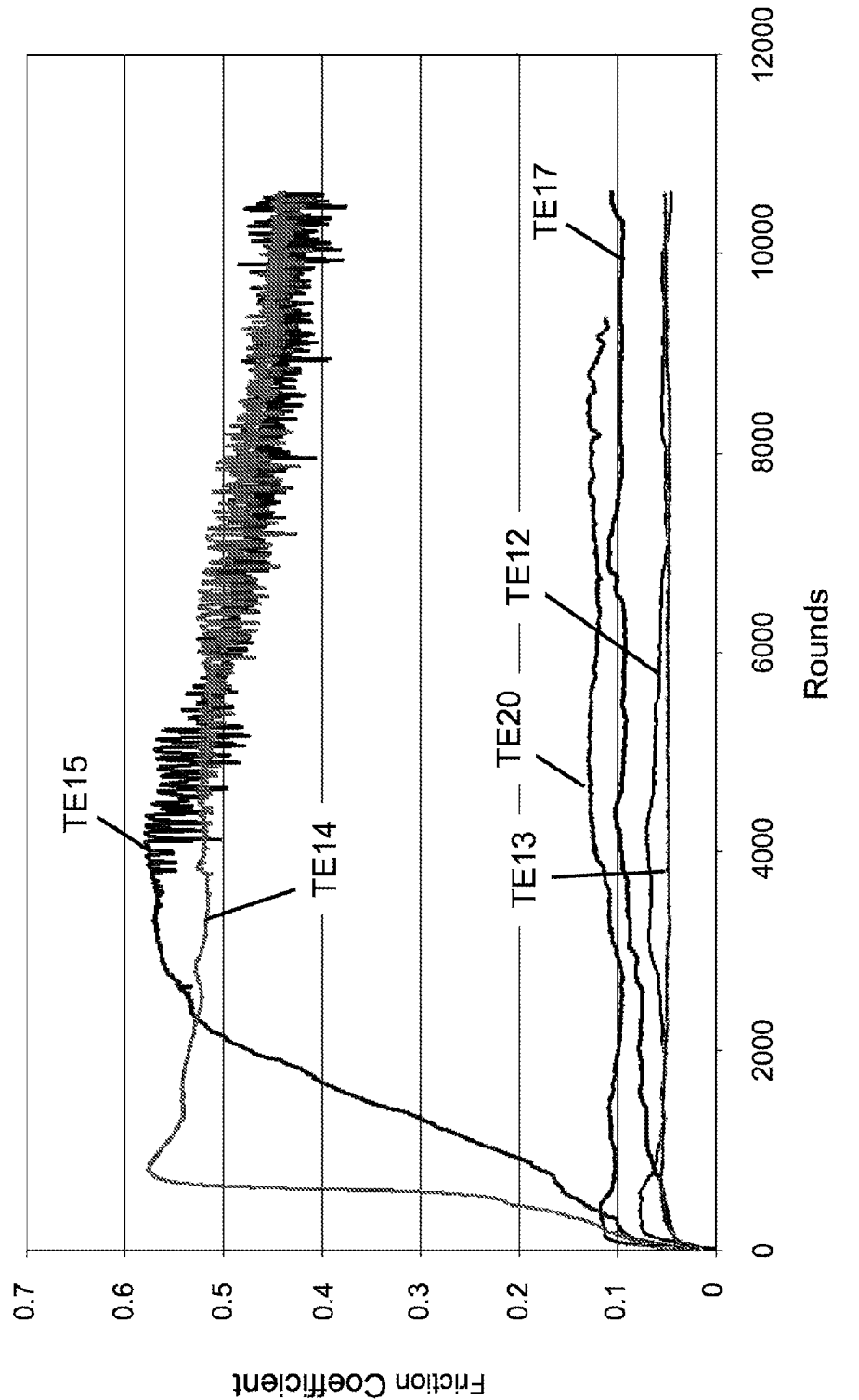
FIG. 21 is a graph plotting friction coefficient as a function of rounds for embodiments of epoxy matrix coatings having different HDPE concentrations.

A third solid state lubricant investigated was polymeric HDPE. HDPE may be used in epoxy resins due to the low curing temperature required for epoxy resins (Table 7, FIG. 21).

TABLE 7

Wear testing results for HDPE/D10H containing epoxy coating systems

| Sample No. | Epoxy Resin [g] | HDPE [g] | D10H [g] | Zinc [g] | Zinc(II) Phosphate. [g] | Carbon Black [g] | k [mm$^3$/N/m] |
|---|---|---|---|---|---|---|---|
| TE12 | 25 | 4 | 0 | 0 | 0 | 0 | <2.0E−06 |
| TE14 | 25 | 2 | 0 | 0 | 0 | 0 | <2.0E−06 |
| TE15 | 25 | 1 | 0 | 0 | 0 | 0 | 1.26E−04 |
| TE17 | 25 | 8 | 0 | 0 | 0 | 0 | <2.0E−06 |
| TE18 | 25 | 4 | 1 | 0 | 0 | 0 | <2.0E−06 |
| TE19 | 25 | 4 | 2 | 0 | 0 | 0 | <2.0E−06 |
| TE20 | 25 | 4 | 2 | 2 | 0.5 | 0.5 | <2.0E−06 |
| TE21 | 25 | 4 | 2 | 4.5 | 0.5 | 0.5 | <2.0E−06 |

Investigations on coatings containing HDPE showed that as the HDPE amount increases, the friction coefficient decreases. For coatings with HDPE content greater than about 4 g, the friction coefficient was measured and was in the range of about μ=0.05-0.15. The wear coefficient also measured to be substantially low, approximately k<2.0 E-6 mm$^3$/Nm.

Example 13

Figure 22:
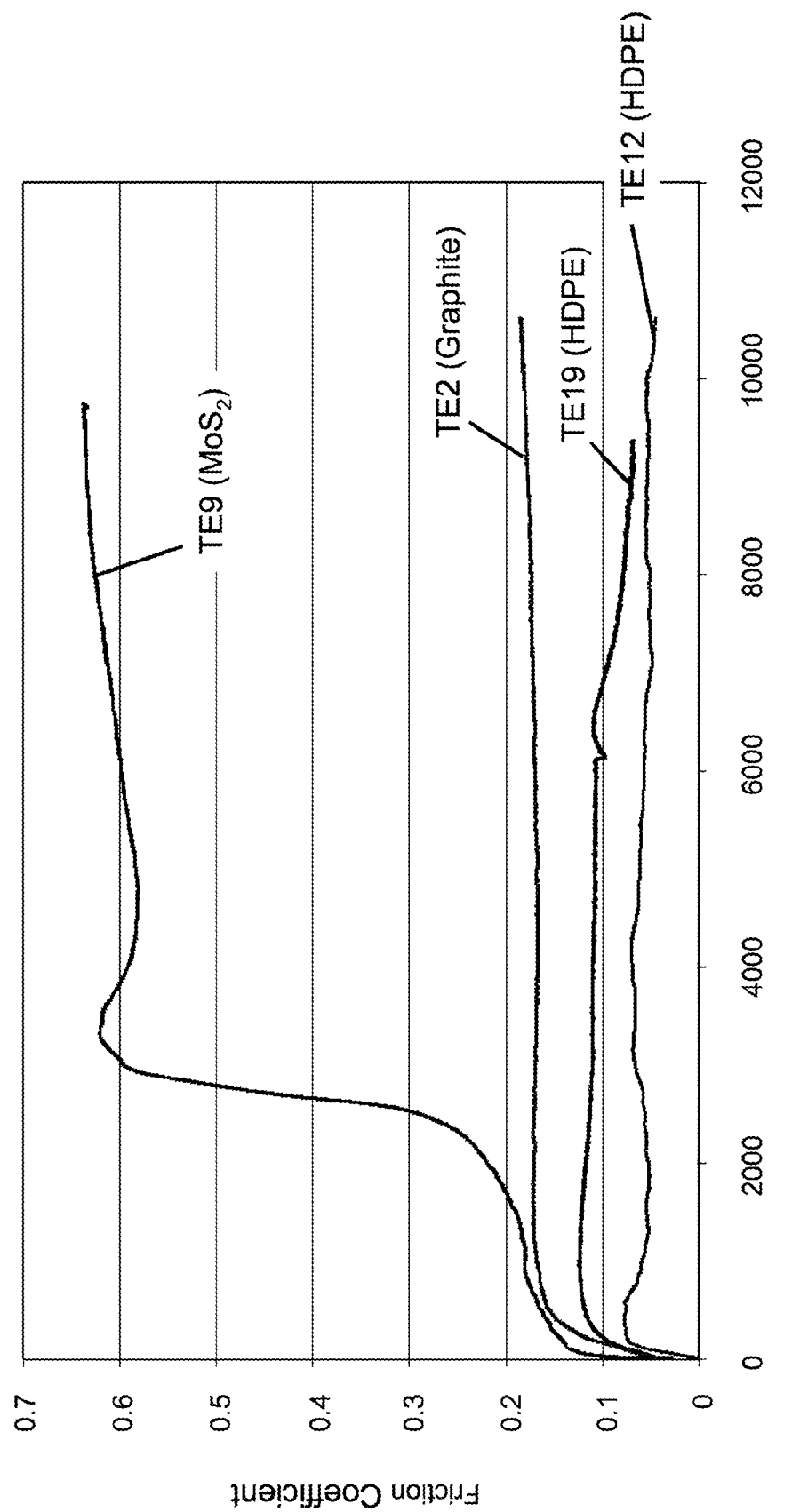
FIG. 22 is a graph plotting friction coefficient as a function of rounds for embodiments of epoxy matrix coatings having different lubricants.

Comparison of Tribological Properties of Epoxy-Based Coating Systems Having Different Lubricants FIG. 22 summarizes the tribological characterization of epoxy-based coating systems having different lubricants.

Examination of the effect of different lubricants on the tribological characteristics of epoxy-based coating systems showed that a relatively low friction coefficient can be obtained with HDPE (FIG. 22). In contrast to the polyimide systems, HDPE can be used in the epoxy coatings due to the lower curing temperatures of epoxy resins, which are below about 120° C.

From these results, it can be derived that epoxy matrix based coating systems possessing HDPE as solid state lubricant are promising. With this combination, it is possible to obtain a system where the base matrix and the lubricant itself are polymers, which means that both, the epoxy and HDPE, act as the matrix components of the coating. This means, additionally, that the coating would be built-in with corrosion inhibitors based on nanoparticles, if additional corrosion protection was required.

Example 14

Corrosion Testing of Epoxy/HDPE Coating Systems

Owing to the excellent tribological behavior of the HDPE containing epoxy coating systems, corrosion evaluation was performed. Due to the promising results mentioned above and the expected good adhesion of the epoxy systems on polar surfaces, the coatings were applied on the cleaned steel surfaces without any primer. The results of the SST of composition TE13 (unfilled Epoxy/HDPE coating) are shown in FIG. 23.

Figure 23:
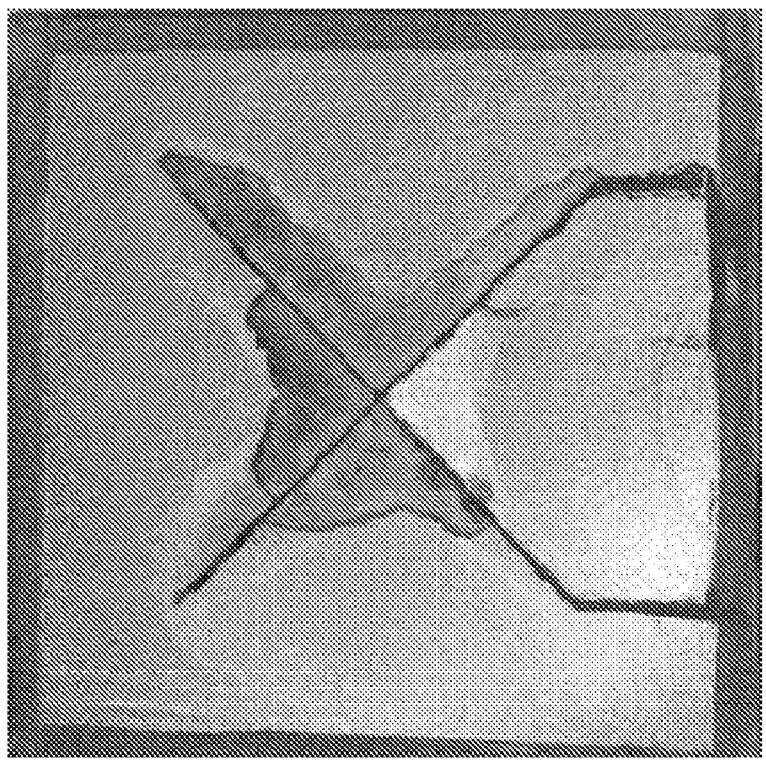
FIG. 23 is a photograph of an embodiment of coating composition TE13, without primer, after an approximately 200 h SST illustrating delamination around the scratch.

From FIG. 23 it was observed that the coating shows delamination around the scratch after a salt spray test of about 200 h.

To further improve the corrosion resistance of the Epoxy/HDPE coatings additional compounds may be added to the coating composition. Examples include, but are not limited to, Zinc and Zinc (II) phosphate as corrosion inhibitors, carbon black for conductivity, as well as SiC for reinforcement. An investigated coating, TE20, contained about 25 g Epoxy, about 4 g HDPE, about 0.5 g zinc (II) phosphate, about 2 g zinc and about 0.5 g carbon black (Table 7). The results of the salt spray test on this system are shown in FIG. 24.

Figure 24B:
FIGS. 24A and 24B are photographs of embodiments of coating composition TE20, without primer after salt spray testing; (24A) after an approximately 200 h SST; (24B) after an about 500 h.
Figure 24A:
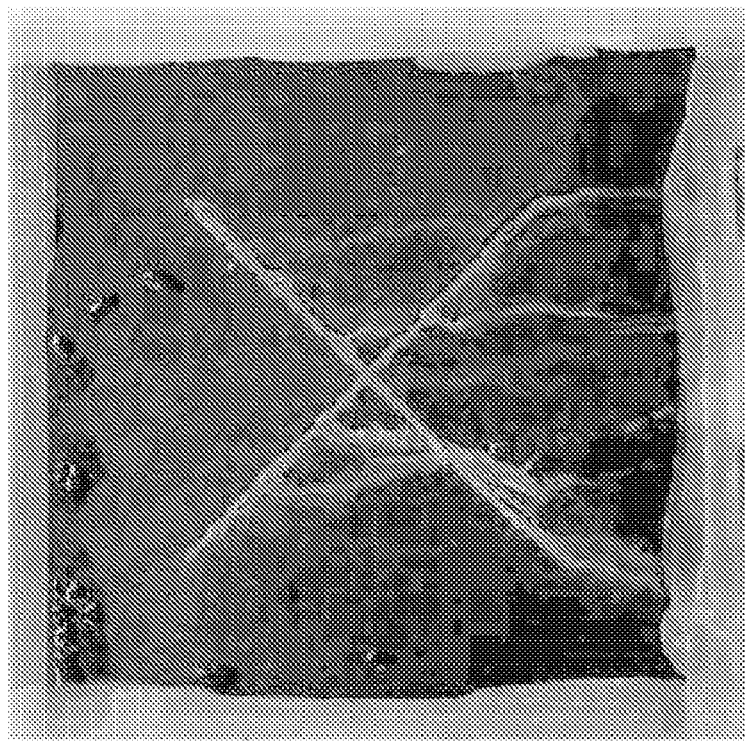

As illustrated in FIGS. 24A and 24B, the composition TE20 showed no blistering, good adhesion and no corrosion after 500 h SST. Advantageously, this result was obtained without the use of a primer.

Example 15

Epoxy Matrix Coating Systems Having Single Additives

Selected experiments were conducted in order to evaluate the influence of the anticorrosion and adhesion additives individually. In Example 15, anticorrosion additives examined were: a talc, Microtalc® AT1 (Norwegian Talc Deutschland GmbH), zinc oxide, Heucophos® ZCP (a zinc calcium strontium orthophosphate silicate hydrate), Heucophos® ZAM (a zinc aluminum molybdenum orthophosphate hydrate), and Heucorin® RZ (zinc-5-nitroisophthalate). The epoxy was prepared as discussed above and mixed with the anticorrosion compound. The coating compositions were subsequently spray coated and cured on steel surfaces cleaned according to the second cleaning procedure discussed above. Table 8 illustrates the compositions examined.

TABLE 8

Polymer coating formulations containing single additive

| Sample | Epoxy (L20) | HDPE (g) | Additive |
|---|---|---|---|
| TE33 | 25 | 4 | 4 g Microtalc ® AT1 |
| TE44 | 25 | 4 | 4 g ZnO |
| TE48 | 25 | 4 | 3 g Heucorin ® RZ |
| TE49 | 25 | 4 | 3 g Heucorin ® ZAM |
| TE50 | 25 | 4 | 3 g Heucorin ® ZCP |

Figure 25B:
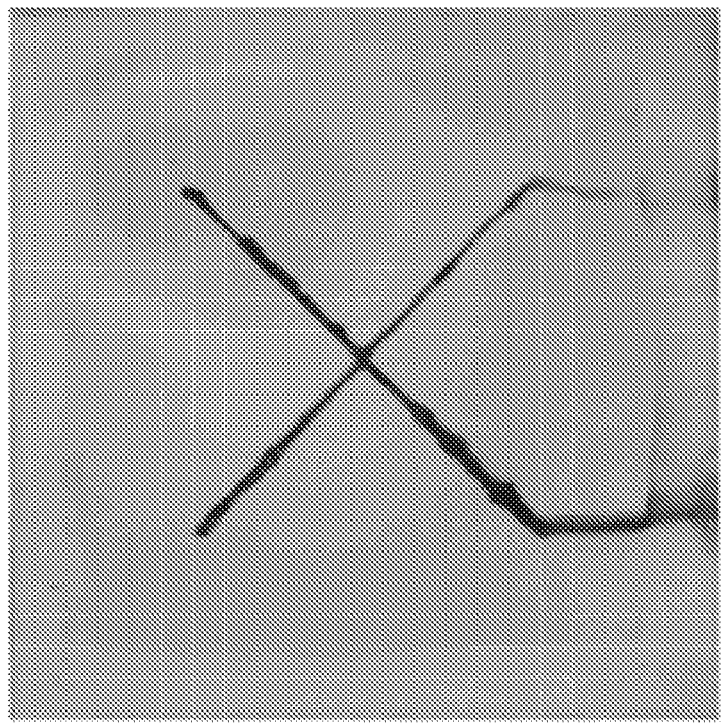
FIGS. 25A and 25B are photographs of embodiments of epoxy matrix coating compositions TE33 and TE34 after an approximately 400 h SST; (25A) TE33; (25B) TE44.
Figure 25A:
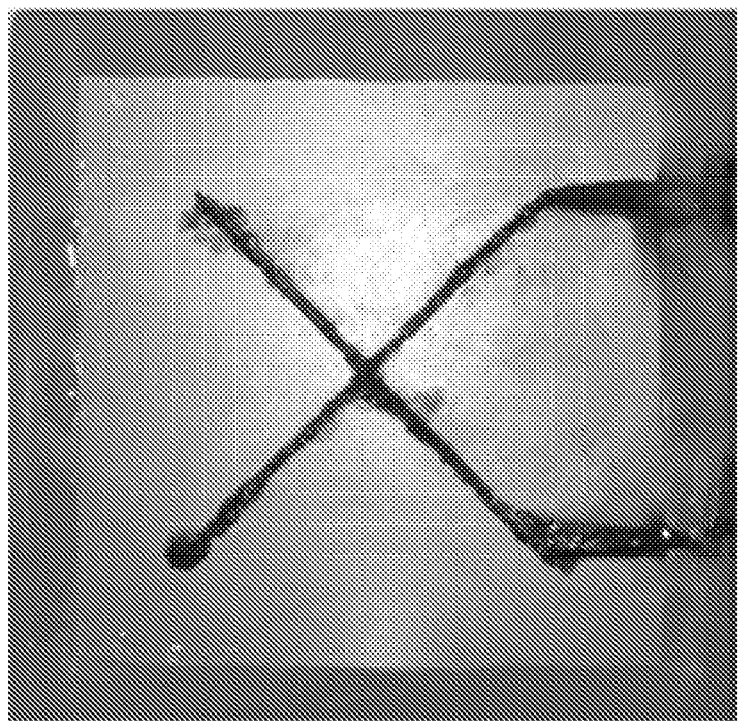

FIGS. 25A and 25B compare the performance of compositions TE33 and TE44 after neutral salt spray testing for about 400 h. Approximately 12 wt. % Microtalc® AT1 was present in TE33, while approximately 12 wt. % ZnO was present in TE44. Examining the surfaces of each coating after testing, the TE33 coating (FIG. 26A) was found to exhibit subsurface migration, while the TE44 coating (FIG. 26B) exhibited substantially no blisters at the scratch. From these observations, ZnO appears more effective as an adhesion additive as the AT 1.

Figures 26A, 26B, 26C:
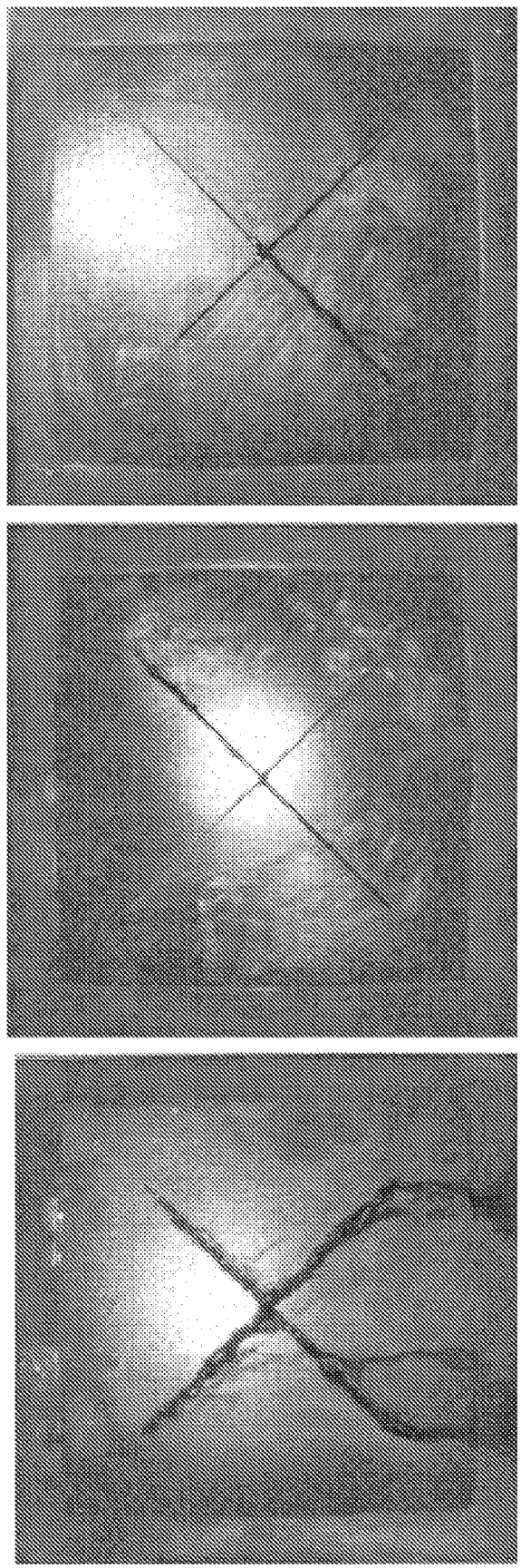
FIGS. 26A-26C are photographs of embodiments of epoxy matrix coating compositions TE48, TE49, TE50 after approximately 400 h SST; (26A) TE48; (26B) TE49; (26C) TE50.

FIGS. 26A-26C compare the performance of compositions TE48 (FIG. 26A), TE49 (FIG. 26B), and TE50 (FIG. 27C) after about 400 h SST. Approximately 10 wt % Heucorin® RZ was present in composition TE48, while approximately 10 wt. % Heucophos® ZAM was present in composition TE49, and approximately 10 wt. % Heucophos® ZCP was present in composition TE50. Examining the surfaces of each coating after testing, the TE48 coating (FIG. 26A) was found to exhibit significant surface corrosion, while the TE49 (FIG. 26B) and TE50 coatings (FIG. 26C) exhibited substantially no blisters and approximately no corrosion at the scratch. From these observations, the orthophosphate compositions, TE49 and TE50, appear to provide improved corrosion resistance over the nitroisopthalate composition, TE48.

Figure 27B:
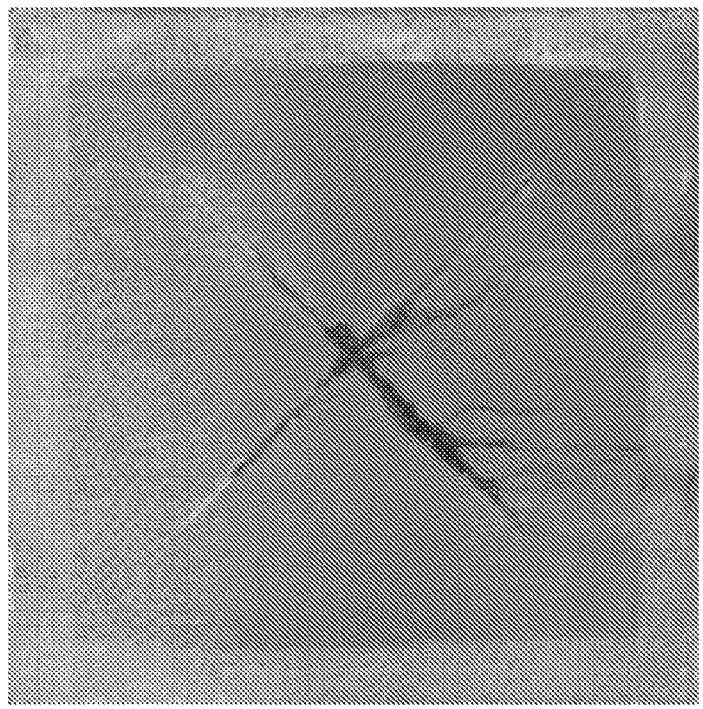
FIGS. 27A and 27B are photographs of embodiments of epoxy matrix coating compositions TE49 and TE50 after an approximately 400 b of neutral salt spray exposure; (27A) TE49; (27B) TE50.
Figure 27A:
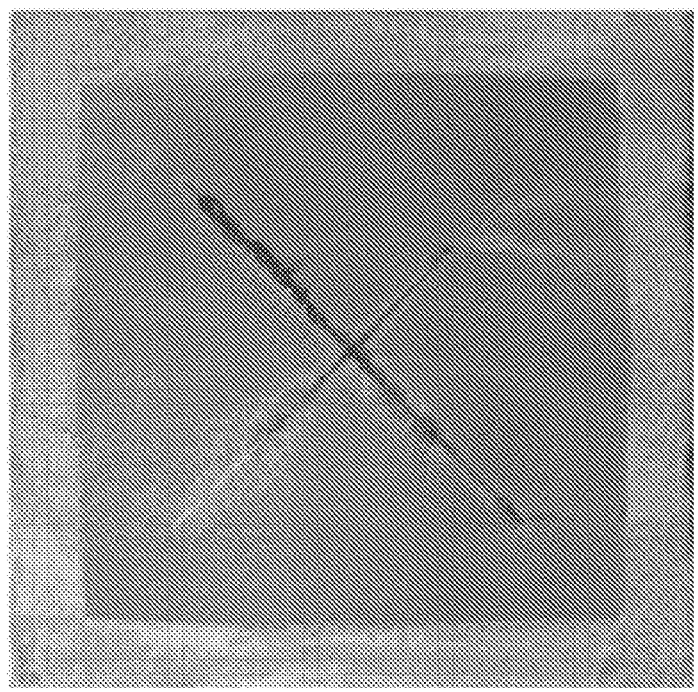

FIGS. 27A and 27B compare the performance of compositions TE49 and TE50 (Heucophos® ZAM and ZCP, respectively) after about 668 h SST. Examining the surfaces of each coating after testing, the TE49 coating (FIG. 27A) was found to exhibit scratch delamination, while the TE50 (FIG. 27B) exhibited only partial delamination.

Figure 28:
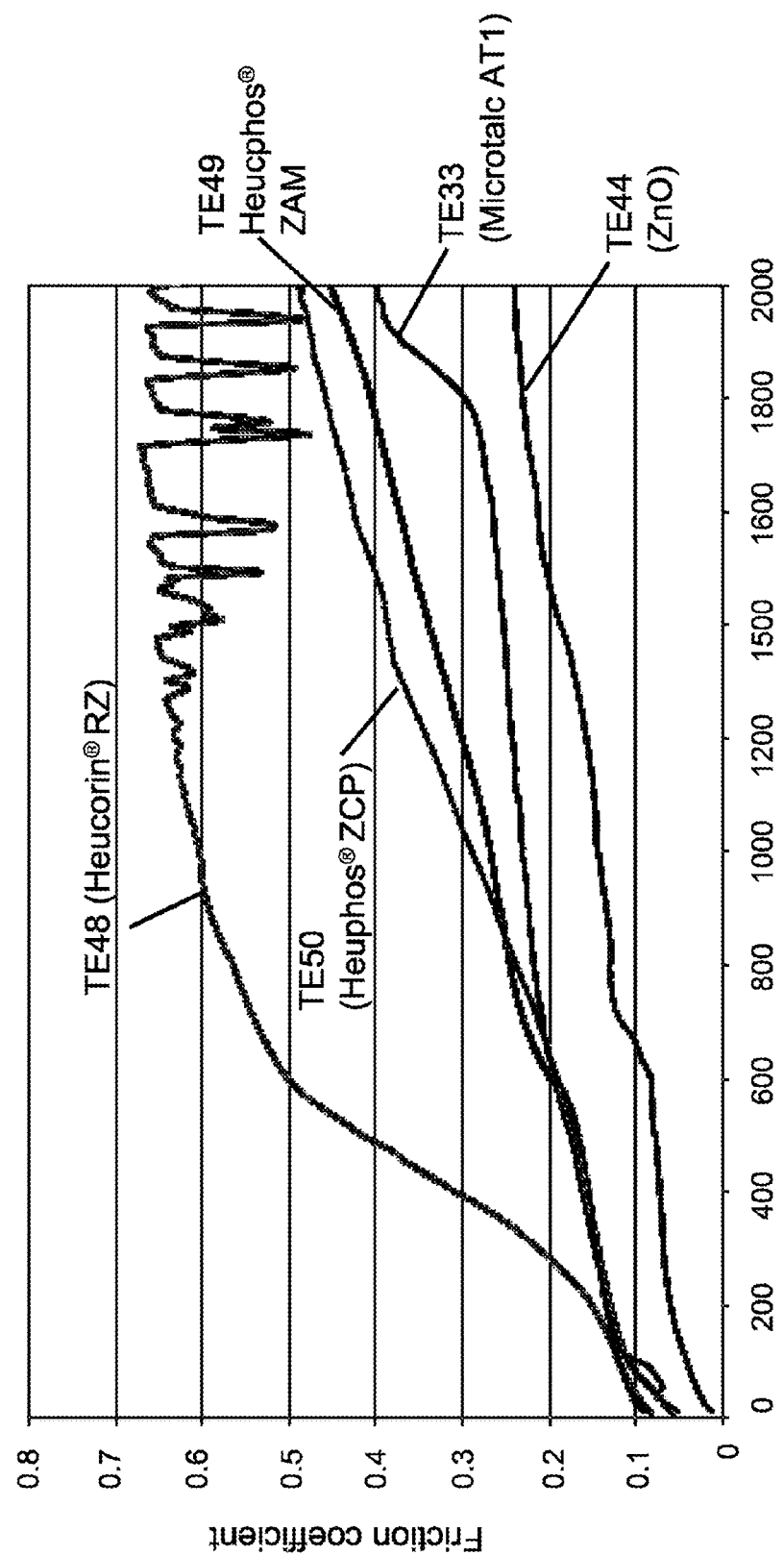
FIG. 28 is a graph plotting friction coefficient as a function of rounds for embodiments of epoxy matrix coating compositions TE33, TE44, TE48, TE49, TE50 having varied anti-corrosion additives.

The friction coefficient of compositions TE33, TE44, TE48, TE49, and TE50 were also examined through pin-on-disc tests. The results of these tests are summarized in FIG. 28. The ZnO containing coating, TE44, was found to exhibit the lowest friction coefficient of the samples tested. Over a short initial time period, coatings containing Heucophos® ZAM and ZCP, TE49 and TE50, respectively, exhibited comparable friction coefficients to ZnO.

Example 16

Corrosion Resistance—ZnO Additive Extended Exposure

Coating composition TE44, a coating comprising an epoxy matrix with HDPE lubricant and ZnO adhesion additives were examined. In one embodiment, the epoxy comprised epoxy resin L20 and curing agent EPH161 (R&G GmbH). The resin and curing agent were mixed in a ratio of about 100:29 by volume to provide a total epoxy mass of about 25 g. To this epoxy mixture was added about 4 g of ZnO and about 4 g HDPE. The composition was mixed to disperse the ZnO and HDPE substantially uniformly within the polymer matrix. The coating composition was subsequently spray coated and cured on steel surfaces cleaned according to procedure two, described above. In one embodiment, the cure may be performed according to the manufacturer's instructions, roughly 24 h at about room temperature, followed by annealing for about 15 h at a minimum temperature of about 60° C. In alternative embodiments, the coating can be annealed at temperatures up to about 150° C.

Figure 29C:
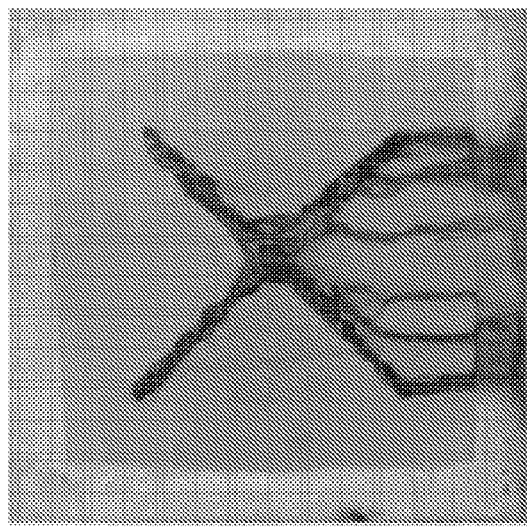
FIGS. 29A-29C are photographs of an embodiment of epoxy matrix coating composition TE44 after SST; (29A) 500 h; (29B) 1100 h; (29C) 2000 h.
Figure 29B:
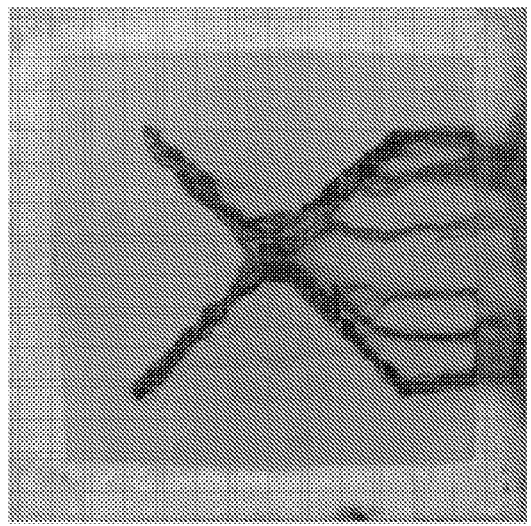
Figure 29A:
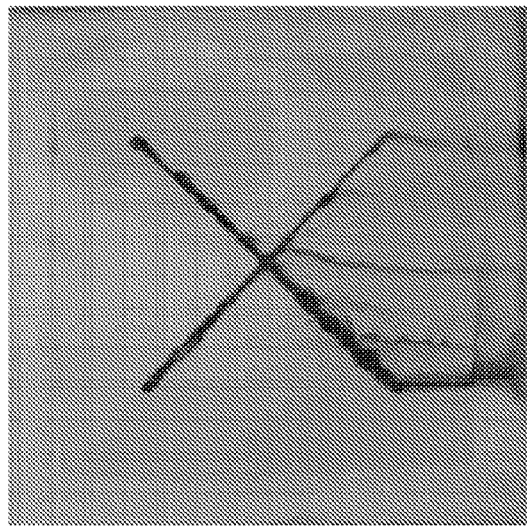

The corrosion resistance of the coating so formed was examined on flat samples using the salt spray test. FIGS. 29A-C illustrate samples tested for SST exposure times of about 500 h (FIG. 29A), 1100 h (FIG. 29B), and 2000 h (FIG. 29C). The results indicate that the coating passes the salt spray test and substantially no delamination or blistering is observed in the samples, even up to 2000 h of exposure.

To further examine the corrosion protection ability of the coating, the coating was substantially removed to allow examination of the underlying metallic surface. Coating removal was performed by exposure to an approximately 10% NaOH solution for about 1 h at about 100° C.

Figure 30:
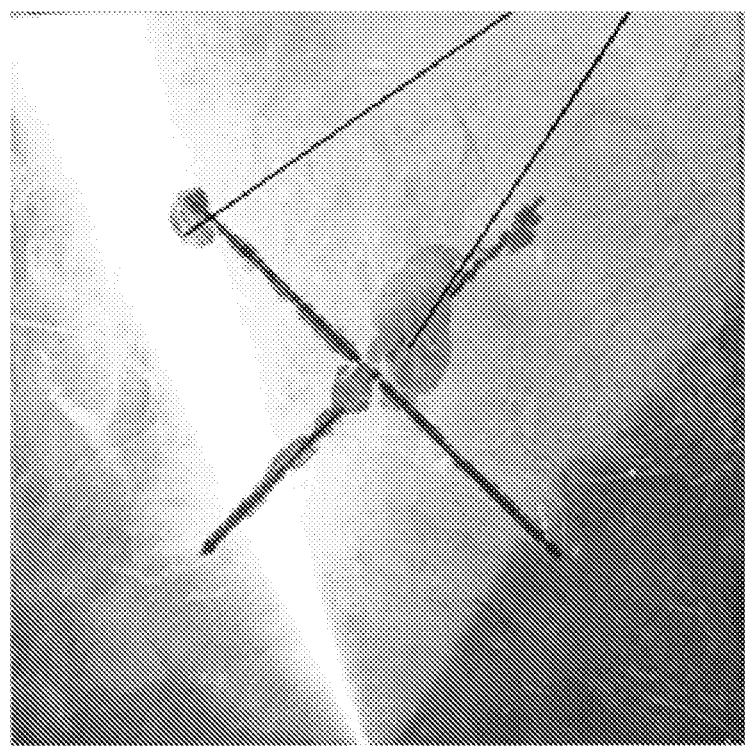
FIG. 30 is a photograph of a metallic substrate underlying epoxy matrix coating composition TE44 after SST.

FIG. 30 illustrates the resulting exposed metal surface. Substantially no corrosion was observed on the surface. However, other surface features are present. It is speculated that these features may be attributed to blistering at the scratch or insufficient cleaning of the surface.

Example 17

Corrosion Resistance—Epoxy Matrix Coatings with D10H, ZnO, and ZCP Additives

The composition of Example 17 is further modified to improve the coating performance. In certain embodiments, a reactive fluoropolymer, comprising Fluorolink D10H, and an additional corrosion inhibiting agent, comprising Heucophos® ZCP, were added to the coating composition. The coating composition was spray coated and cured on steel surfaces cleaned according to cleaning procedure three, discussed above. The proportions of each component in the compositions examined are outlined in Table 9 below.

TABLE 9

Epoxy matrix coating formulations containing anticorrosion compound and D10H

| Sample | Epoxy (L20) | HDPE (g) | D10H (g) | ZCP (g) | ZnO - 1 μm (g) | ZnO - 50 nm (g) |
|---|---|---|---|---|---|---|
| TE60 | 25 | 1 | 0.3 | 0 | 4 | 0 |
| TE61 | 25 | 1 | 0.3 | 0 | 0 | 4 |
| TE62 | 25 | 1 | 0.3 | 0.5 | 4 | 0 |
| TE63 | 25 | 1 | 0.3 | 1 | 4 | 0 |
| TE64 | 25 | 1 | 0.3 | 2 | 4 | 0 |
| TE65 | 25 | 1 | 0.3 | 0.5 | 0 | 4 |
| TE66 | 25 | 1 | 0.3 | 1 | 0 | 4 |
| TE67 | 25 | 1 | 0.3 | 2 | 0 | 4 |
| TE68 | 25 | 1 | 0.3 | 0 | 0 | 0 |

As illustrated in Table 9, samples TE60 and TE61 investigated the influence of the size of the ZnO in the absence of ZCP. Samples TE62, TE63, and TE64 investigated the influence of the amount of ZCP, ranging from about 0.5 to 2 g for ZnO particles of about 1 μm in size, while samples TE65, TE66, and TE67 investigated the same for ZnO particles of about 50 nm in size. Sample TE68 provided a baseline without any ZCP or ZnO addition.

The results of SST testing after 2000 h exposure are illustrated below in Table 10. Three samples were prepared for each composition. Results are presented for each sample, as well as the average of the three samples.

TABLE 10

| | | Corrosion testing results | | | |
|---|---|---|---|---|---|
| Sample | Size ZnO | Plate #1 scratch/surface | Plate #2 scratch/surface | Plate #3 scratch/surface | Average scratch/surface |
| TE60 | 1 μm | —/690 h | —/1196 | 860 h/1004 h | —/963 h |
| TE62 | 1 μm | 690 h/1196 h | 1004 h/1196 h | 860 h/1196 h | 851 h/1196 h |
| TE63 | 1 μm | 690 h/1196 h | 860 h/1388 h | 1532 h/OK | 1027 h/— |

TABLE 10-continued

Corrosion testing results

| Sample | Size ZnO | Plate #1 scratch/surface | Plate #2 scratch/surface | Plate #3 scratch/surface | Average scratch/surface |
|---|---|---|---|---|---|
| TE64 | 1 µm | 1196 h/OK | 1388 h/OK | 1388 h/OK | 1324 h/OK |
| TE61 | 50 nm | 690 h/1004 h | 690 h/1196 h | 690 h/1196 h | 690 h/1123 h |
| TE65 | 50 nm | 690 h/1316 h | 1388 h/1868 h | 1532 h/1700 h | 1203 h/1628 h |
| TE66 | 50 nm | 1004 h/2000 h | 1196 h/OK | 1004 h/OK | 1068 h/OK |
| TE67 | 50 nm | 1196 h/OK | 1388 h/OK | 1868 h/OK | 1484 h/OK |

The first number in Table 10 represents the time at which blisters are first observed at about the scratch. The second value in Table 10 represents the time at which blisters were observed on the surface of the sample. An entry of OK indicates that substantially no blistering is observed when the test was concluded after about 2000 h. As illustrated in Table 10, compositions TE64 and TE67 both survived 2000 h with substantially no apparent blistering on the surface of the sample. As these two compositions possessed the highest amount of Heucophos® ZCP, this result indicates that the Heucophos® ZCP plays a significant role in improving corrosion resistance.

Coating composition TE64 comprised approximately 77.4% L20 epoxy resin, approximately 3.1 wt. % HDPE and 0.9 wt. % Fluorolink D10H as solid state lubricants, 6.2 wt. % Heucophos ZCP, and about 12.4 wt. % ZnO having a size of about 1 µm. TE67 comprises approximately 77.4 wt. % L20 epoxy resin, approximately 3.1 wt. % HDPE and 0.9 wt. % Fluorolink D10H as solid state lubricants, 6.2 wt. % Heucophos ZCP, and about 12.4 wt. % ZnO having a size of about 50 nm. All percentages are on the basis of weight of the composition.

The extent of corrosion in coatings TE64 and TE67 were also examined after various approximate exposure times: 500 h, 860 h, 1500 h, 1868 h, and 2000 h (TE64) and 860 h, 1000 h, 1500 h, 1500 h, 1868 h, and 2000 h (TE67). Upon examination, it was found in both coating systems that substantially no surface corrosion was observed in areas protected by the coating. Examining the appearance of the metal surface after the coatings were removed in the vicinity of the scratch by treatment with NaOH, as discussed above with respect to Example 18, found substantially no corrosion in the metal within the area proximate to the scratch. Based upon these results, the two ZnO containing compositions, TE64 and TE67, exhibit substantially comparable performance as anti-corrosion coatings.

Figure 31:
FIG. 31 is a graph plotting friction coefficient as a function of rounds for embodiments of epoxy matrix coating compositions TE60, TE61, TE64, TE67, TE68 having varied amounts of Heucophos® ZCP and ZnO, as well as varied size of ZnO.

The friction coefficient of compositions TE60, TE61, TE64, and TE67, as well as a reference coating without the incorporation of ZnO or ZCP, designated TE68, were examined through pin-on-disc tests. The results of these tests are summarized in FIG. 31. These results indicate that, for short durations, friction coefficients of less than about 0.15 may be obtained.

Example 18

Corrosion Resistance—Threaded Connections

Figure 32A:
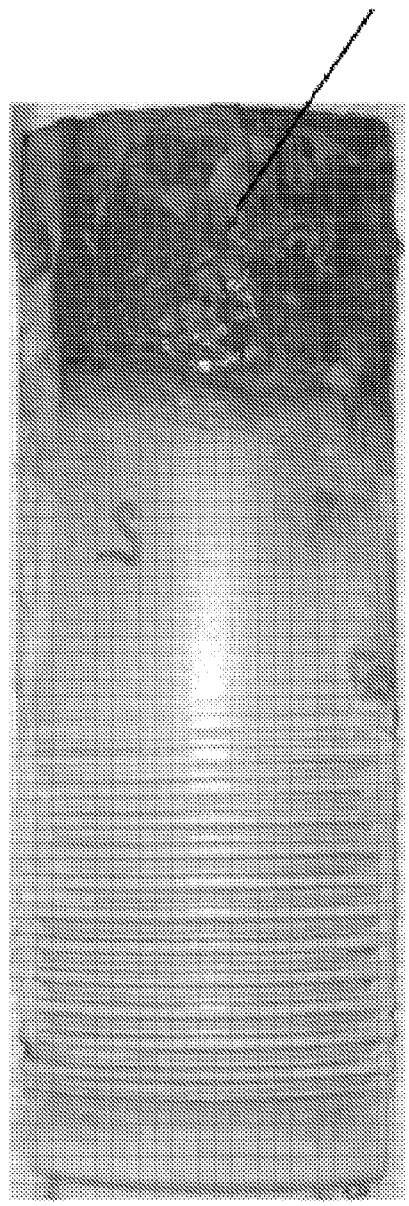
FIGS. 32A and 32B are photographs of embodiments of threaded connections threads partially coated with epoxy matrix coating compositions TE64 (32A) and TE67 (32B); Corrosion can be observed in the uncoated areas.
Figure 32B:
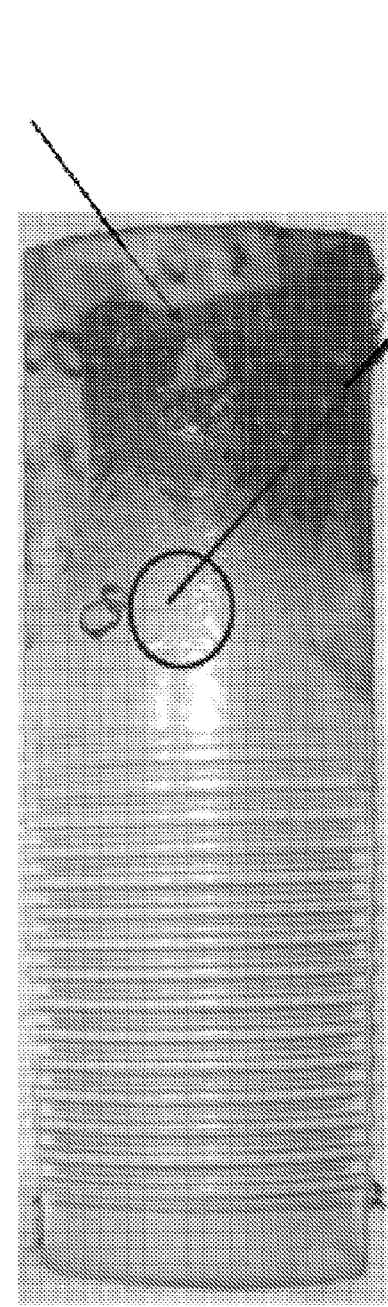

FIGS. 32A and 32B illustrate the results of salt spray testing performed on threaded connections partially coated with compositions TE64 (FIG. 32A) and TE67 (FIG. 32B). The left hand side of each threaded connection was coated, while the right hand side was not. Each connection was subjected to SST for approximately 500 h. As illustrated in FIGS. 32A, 32B the coated, left hand side of each threaded connection is substantially free of corrosion, while the uncoated, right hand side of each threaded connection exhibits significant corrosion.

Example 19

Corrosion Resistant Layer in Combination with as Second Lubricating Layer

The coating systems TE64 and TE67, which showed good corrosion resistance, were applied over a commercially available threaded connection known as a "premium connection", having a metal-to-metal seal and torque shoulder and an external diameter of about 3.5 inches (TenarisBlue®, Tenaris, Argentina), in order to evaluate frictional and tribological properties of the coatings.

Several assembling and disassembling operations were carried out using a pin coated with TE64 and a bared box; and a pin coated with TE67 and a bared box. The important parameters of the test are torque versus turn behavior, shoulder torque (which is related to the friction during sliding) and its consistency through successive assembling and disassembling operations and galling resistance performance. The term "shoulder torque" as used herein has its ordinary meaning as known to those skilled in the art. In the context of the threaded connections described herein, shoulder torque will be understood as reference to the torque when the shoulder of the pin and the shoulder of the box substantially abut, producing an abrupt change in the slope of a plot of torque versus turns measured during the assembly of a pipe. Satisfactory anti-galling properties were observed with both coating systems, with variations in shoulder torque ranging from about 3000 to 4500 lbf ft.

Further testing was performed in which the coating systems TE64 and TE67 were applied over the pins, and the second, lubricating coating composition recited above was applied over the inner surfaces of the box.

During the successive assembling and disassembling operations, both coating systems showed extraordinary anti-galling features and consistent frictional properties. Shoulder torque values ranged from about 2000 to 3000 lbf ft, showing a decrease in friction coefficient due to the contribution of the dry film lubricant applied to the box.

Example 20

Corrosion Resistant Layer without Incorporation of Solid Lubricant

Corrosion resistant coating systems based on epoxy, reactive fluoropolymer (D10H), a corrosion inhibiting agent (Heucophos® ZCP), and nanoparticles of ZnO were investigated. These coating systems did not contain solid state lubricants. The coating compositions investigated are detailed in Table 11 below:

TABLE 11

Epoxy matrix coating formulations without solid state lubricants

| Sample | Epoxy (wt. %) | D10H (wt. %) | ZCP (wt. %) | ZnO - 50 nm (wt. %) |
|---|---|---|---|---|
| TE105 | 92 | 1 | 7 | 0 |
| TE106 | 85 | 1 | 0 | 14 |
| TE107 | 81 | 0 | 6 | 13 |
| TE108 | 80 | 1 | 6 | 13 |

The coating systems were applied over Q-Panels (Q-Lab Corporation, Cleveland, Ohio) and cured for about 30 minutes at about 150° C., with three testing panels prepared per sample. The Q-Panels, made from low-carbon steel, exhibit corrosion more quickly than N80 substrates, under substantially similar conditions, providing a method by which to perform accelerated corrosion tests. Thus, corrosion testing using Q-panels allows a comparison of the corrosion resistance of the different coating systems through an accelerated test.

Testing samples were placed in the testing chamber and continuously exposed to a salt solution (about 5 wt. % NaCl) at about 35° C. in accordance with ASTM Standard B117. The corrosion advance was further monitored at regular intervals of time. After an exposure time of about 750 h, each of the coating systems showed good corrosion resistance, with only small evidence of corrosion. Of the coating systems TE105, TE106, TE107, and TE 108, the TE108 coating showed the best corrosion resistance, with the fewest corrosion signs.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A threaded joint, comprising:
    a pin member and a box member, wherein the pin member possesses a first thread portion adapted to mate with a second thread portion of the box member;
    a first coating composition deposited on the thread portion of at least one of the pin and box members, comprising:
        a polymer selected from the group consisting of epoxies and polyimides;
        about 0.5 to about 15 wt. % of a perfluoropolyether;
        about 5 to about 15 wt. % of at least one of an anticorrosion compound selected from the group consisting of a zinc calcium strontium orthophosphate silicate hydrate compound, a zinc calcium aluminum strontium orthophosphate polyphosphate silicate hydrate, a zinc aluminum molybdenum orthophosphate hydrate, a zinc nitroisophthalate, and a zinc phosphomolybdate; and
        about 10 to about 15 wt. % of an adhesion additive comprising zinc oxide having a mean diameter ranging between approximately 10 nm to approximately 10 µm, said zinc oxide provided in an effective amount to promote adhesion of the first coating composition to the thread portion;
    wherein the balance of the first coating composition is comprised of the polymer and wherein the percentage of each component is on the basis of the total weight of the first coating composition.

2. The threaded joint of claim 1, wherein the perfluoropolyether chemically reacts with the polymer so as to form a plurality of covalent bonds between the polymer and the perfluoropolyether.

3. The threaded joint of claim 2, wherein the perfluoropolyether is condensable with the polymer.

4. The threaded joint of claim 1, wherein the first coating composition comprises a single layer.

5. The threaded joint of claim 1, wherein the first coating composition further comprises about 3 to about 30 wt. % of a solid lubricant.

6. The threaded joint of claim 5, wherein the solid lubricant comprises at least one of high density polyethylene (HDPE), polytetrafluoroethylene (PTFE), graphite, and molybdenum disulfide (MoS2).

7. The threaded joint of claim 5, wherein the friction coefficient of the first coating composition ranges between approximately 0.03 and approximately 0.10.

8. The threaded joint of claim 1 or claim 5, wherein the mean diameter of the zinc oxide ranges between about 10 to about 300 nm.

9. The threaded joint of claim 1 or claim 5, wherein the first coating composition further comprises an inorganic reinforcement.

10. The threaded joint of claim 9, wherein the inorganic reinforcement possesses a mean diameter less than about 300 nm.

11. The threaded joint of claim 10, wherein the reinforcement is present in an amount ranging from about 5 to about 10 wt %, based on the total weight of the first composition.

12. The threaded joint of claim 11, wherein the reinforcement comprises at least one of silicon carbide (SiC), titanium dioxide (TiO2), aluminum oxide (Al2O3), and silicon dioxide (SiO2).

13. The threaded joint of claim 1 or claim 5, wherein the first coating composition further comprises at least one of:
    about 3 to about 8 wt % zinc;
    about 1 to about 5 wt. % zinc(II)phosphate;
    about 1 to about 5 wt. % Carbon black; and
    about 10 to about 20 wt. % of polydimethylsiloxane;
    wherein the amount of each is based upon the total weight of the first composition.

14. The threaded joint of claim 1 or claim 5, wherein the wear coefficient of the first coating composition is less than approximately $2.0 \times 10^{-6}$ mm$^3$/Nm.

15. The threaded joint of claim 1 or claim 5, wherein the first coating composition exhibits substantially no corrosion up to about 1000 h of exposure as tested according to ASTM B 117.

16. The threaded joint of claim 1 or claim 5 wherein a second coating composition layer comprising a dry film lubricant is deposited on a thread portion of at least one of the pin and the box members.

17. The threaded joint of claim 16, wherein the first coating composition is deposited on the pin member and the second coating composition is deposited on the box member.

18. The threaded joint of claim 16, wherein the second coating composition comprises:
    about 4 to about 16 wt. % polytetrafluoroethylene (PTFE);
    about 8 to about 24 wt. % of a reactive epoxy;
    about 1 to about 6 wt. % titanium dioxide; and
    a solvent;
    wherein the amount of each component is on the basis of the total weight of the second coating composition.

19. The coating composition of claim 16, wherein the combined thickness of the first and second coatings layers is less than about 80 µm.

20. The coating composition of claim 19, wherein the first coating composition comprises a layer that possesses a thickness less than about 40 μm.

21. The coating composition of claim 19, wherein the second coating composition comprises a layer that possesses a thickness less than about 30 μm.

22. The threaded joint of claim 16, wherein the thickness of the first and second coating compositions are approximately equal.

23. The threaded joint of claim 1 or claim 5, wherein the pin and box members are metallic.

24. The threaded joint of claim 1, wherein the at least one of the anticorrosion compound is selected from the group consisting of a zinc calcium strontium orthophosphate silicate hydrate compound, a zinc calcium aluminum strontium orthophosphate polyphosphate silicate hydrate, a zinc aluminum molybdenum orthophosphate hydrate, and a zinc phosphomolybdate.

25. A threaded joint, comprising:
a pin member and a box member, wherein the pin member possesses a first thread portion adapted to mate with a second thread portion of the box member;
a first coating composition deposited on the thread portion of at least one of the pin and box members, comprising:
a polymer;
about 0.5 to about 15 wt. % of a fluorine containing polymer modifier;
about 5 to about 15 wt. % of a corrosion inhibiting agent comprising at least one metal with a functional group, wherein the metal is selected from the group consisting of Zn, Ca, Mg, Sr, and Al and the functional group is selected from the group consisting of phosphate functional groups, molybdate functional groups, phosphomolybdate functional groups, and phosphosilicate functional groups; and
about 10 to about 15 wt. % of an adhesion additive comprising inorganic particles having a mean diameter ranging between approximately 10 nm and approximately 10 μm;
a second coating composition comprising a dry film lubricant dispersed within an epoxy deposited on the thread portion of at least one of the pin and the box members;
wherein the balance of the first composition is comprised of the polymer and wherein the percentage of each component is on the basis of the total weight of the first coating composition.

26. The threaded joint of claim 25, wherein the polymer is selected from the group consisting of epoxies and polyimides.

27. The threaded joint of claim 25, wherein the polymer modifier comprises a perfluoropolyether.

28. The threaded joint of claim 27, wherein the perfluoropolyether chemically reacts with the polymer so as to form a plurality of covalent bonds between the polymer and the perfluoropolyether.

29. The threaded joint of claim 28, wherein the perfluoropolyether is condensable with the polymer.

30. The threaded joint of claim 25, wherein the first coating composition comprises a single layer.

31. The threaded joint of claim 25, wherein the inorganic particles comprise zinc oxide having a mean diameter ranging between about 10 to about 300 nm.

32. The threaded joint of claim 31, wherein the first coating composition further comprises about 3 to about 30 wt. % of a solid lubricant.

33. The threaded joint of claim 32, wherein the solid lubricant comprises at least one of high density polyethylene (HDPE), polytetrafluoroethylene (PTFE), graphite, and molybdenum disulfide ($MoS_2$).

34. The threaded joint of claim 32, wherein the friction coefficient of the first coating composition ranges between approximately 0.03 and approximately 0.10.

35. The threaded joint of claim 25 or claim 32, wherein the first coating composition further comprises an inorganic reinforcement.

36. The threaded joint of claim 35, wherein the inorganic reinforcement possesses a mean diameter less than about 300 nm.

37. The threaded joint of claim 36, wherein the reinforcement is present in an amount ranging from about 5 to about 10 wt. %, based on the total weight of the first composition.

38. The threaded joint of claim 37, wherein the reinforcement comprises at least one of silicon carbide (SiC), titanium dioxide ($TiO_2$), aluminum oxide ($Al_2O_3$), and silicon dioxide ($SiO_2$).

39. The threaded joint of claim 25 or claim 32, wherein the first coating composition further comprises at least one of:
about 3 to about 8 wt % zinc;
about 1 to about 5 wt. % zinc (II) phosphate;
about 1 to about 5 wt. % Carbon black; and
about 10 to about 20 wt. % of the polydimethylsiloxane;
wherein the amount of each is based upon the total weight of the first composition.

40. The threaded joint of claim 25 or claim 32, wherein the wear coefficient of the first coating composition is less than approximately $2.0 \times 10^{-6}$ mm$^3$/Nm.

41. The threaded joint of claim 25 or claim 32, wherein the first coating composition exhibits substantially no corrosion up to about 1000 h of exposure as tested according to ASTM B 117.

42. The threaded joint of claim 25 or claim 32, wherein the pin and box members are metallic.

43. The threaded joint of claim 25, wherein the first coating composition is deposited on the pin member and the second coating composition is deposited on the box member.

44. The threaded joint of claim 25, wherein the second coating composition comprises:
about 4 to about 16 wt. % polytetrafluoroethylene (PTFE);
about 8 to about 24 wt. % of a reactive epoxy;
about 1 to about 6 wt. % titanium dioxide; and
a solvent;
wherein the amount of each component is on the basis of the total weight of the second composition.

45. The threaded joint of claim 25, wherein the thickness of the first and second coating compositions are approximately equal.

46. A method of protecting a threaded joint, comprising:
providing a pin member and a box member, wherein the pin member possesses a first thread portion adapted to mate with a second thread portion of the box member;
providing a first coating composition comprising:
a polymer;
about 0.5 to about 15 wt. % of a fluorine containing polymer modifier;
about 5 to about 15 wt. % of a corrosion inhibiting agent comprising at least one metal with a functional group, wherein the metal is selected from the group consisting_of Zn, Ca, Mg, Sr, and Al and the functional group is selected from the group consisting of phosphate functional groups, molybdate functional groups, phosphomolybdate functional groups, and phosphosilicate functional groups; and
about 10 to about 15 wt. % of an adhesion additive comprising inorganic particles having a mean diameter ranging between approximately 10 nm and approximately 10 μm;
wherein the balance of the first composition is comprised of the polymer and wherein the percentage of each component is on the basis of the total weight of the first coating composition;

providing a second coating composition comprising a dry film lubricant dispersed within an epoxy; and applying each of the first and the second coating compositions on at least the thread portion of at least one of the pin and box members.

47. The method of claim 46, wherein the polymer is selected from the group consisting of epoxies and polyimides.

48. The method of claim 46, wherein the polymer modifier comprises a perfluoropolyether.

49. The method of claim 48, wherein the perfluoropolyether chemically reacts with the polymer so as to form a plurality of covalent bonds between the polymer and the perfluoropolyether.

50. The method of claim 49, wherein the perfluoropolyether is condensable with the polymer.

51. The method of claim 46, wherein the first coating composition comprises a single layer.

52. The method of claim 46, wherein the inorganic particles comprise zinc oxide having a mean diameter ranging between about 10 to about 300 nm.

53. The method of claim 52, wherein the first coating composition further comprises about 3 to 30 wt. % of a solid lubricant.

54. The method of claim 53, wherein the solid lubricant comprises at least one of high density polyethylene (HDPE), polytetrafluoroethylene (PTFE), graphite, and molybdenum disulfide ($MoS_2$).

55. The method of claim 46 or claim 53, wherein the first coating composition further comprises an inorganic reinforcement.

56. The method of claim 55, wherein the inorganic reinforcement possesses a mean diameter less than about 300 nm.

57. The method of claim 56, wherein the reinforcement is present in an amount ranging from about 5 to about 10 wt. %, based on the total weight of the first composition.

58. The method of claim 57, wherein the reinforcement comprises at least one of silicon carbide (SiC), titanium dioxide ($TiO_2$), aluminum oxide ($Al_2O_3$), and silicon dioxide ($SiO_2$).

59. The method of claim 46 or claim 53, wherein the first coating composition further comprises at least one of:
about 3 to about 8 wt % zinc;
about 1 to about 5 wt. % zinc(II)phosphate;
about 1 to about 5 wt. % Carbon black; and
about 10 to about 20 wt. % of the polydimethylsiloxane;
wherein the amount of each is based upon the total weight of the first coating composition.

60. The method of claim 46 or claim 53, wherein the first coating composition is deposited on the pin member and the second coating composition is deposited on the box member.

61. The method of claim 46 or claim 53, wherein the dry film lubricant comprises a solid lubricant dispersed within a polymer matrix and a solvent.

62. The method of claim 61, wherein the dry film lubricant comprises at least one of a self-lubricating film and a metal alloy.

63. The method of claim 46 or claim 53, wherein the second coating composition comprises:
about 4 to about 16 wt. % polytetrafluoroethylene (PTFE);
about 8 to about 24 wt. % of a reactive epoxy;
about 1 to about 6 wt. % titanium dioxide; and
a solvent;
wherein the amount of each component is on the basis of the total weight of the second coating composition.

64. The method of claim 46 or claim 53, wherein the thickness of the first and second coating compositions are approximately equal.

65. The method of claim 46 or claim 53, further comprising curing at least one of the first and second coating compositions at a temperature of less than about 150° C.

66. The method of claim 46 or claim 53, wherein the pin and box members are metallic.

67. The method of claim 46 or claim 53, wherein at least one of the pin and the box members are subjected to a surface treatment in order to improve the adherence of the coating to the surface of said pin and box members.

68. The method of claim 67, wherein the surface treatment comprises at least one of sand blasting, phosphatization, and copper plating.

69. A threaded joint, comprising:
a pin member and a box member, wherein the pin member possesses a first thread portion adapted to mate with a second thread portion of the box member, wherein at least one surface of the pin or the box member is sand-blasted;
a first coating composition deposited on the thread portion of the pin member, comprising:
an epoxy;
about 0.5 to about 15 wt. % of a perfluoropolyether;
about 5 to about 15 wt. % of at least one of an anticorrosion compound selected from the group consisting of a zinc calcium strontium orthophosphate silicate hydrate compound, a zinc calcium aluminum strontium orthophosphate polyphosphate silicate hydrate, a zinc aluminum molybdenum orthophosphate hydrate, a zinc nitroisophthalate, and a zinc phosphomolybdate; and
about 10 to about 15 wt. % of an adhesion additive comprising zinc oxide having a mean diameter ranging between approximately 10 nm to approximately 10 μm, said adhesion additive provided in an effective amount to promote adhesion of the first coating composition to the thread portion;
wherein the balance of the first coating composition is comprised of the epoxy and wherein the percentage of each component is on the basis of the total weight of the first coating composition; and
a second coating composition deposited on the thread portion of the box member, comprising:
about 4 to about 16 wt. % polytetrafluoroethylene (PTFE);
about 8 to about 24 wt. % of a reactive epoxy;
about 1 to about 6 wt. % titanium dioxide; and
a solvent;
wherein the amount of each component is on the basis of the total weight of the second coating composition.

70. The threaded joint of claim 69, wherein the first coating composition further comprises about 3 to about 30 wt. % of a solid lubricant.

71. The threaded joint of claim 70, wherein the solid lubricant comprises at least one of high density polyethylene (HDPE), polytetrafluoroethylene (PTFE), graphite, and molybdenum disulfide (MoS2).

72. The threaded joint of claim 69, wherein the threaded portion of the pin member comprises a first metal surface and the first coating composition is directly deposited on the first metal surface, and the threaded portion of the box member comprises a second metal surface and the second coating composition is directly deposited on the second metal surface.

* * * * *

UNITED STATES PATENT AND TRADEMARK OFFICE
CERTIFICATE OF CORRECTION

PATENT NO. : 8,322,754 B2
APPLICATION NO. : 11/846489
DATED : December 4, 2012
INVENTOR(S) : Carcagno et al.

It is certified that error appears in the above-identified patent and that said Letters Patent is hereby corrected as shown below:

On the Title Page

In column 2 (page 1) item [56] at line 14, Under Other Publications, change "bevaviour" to --behavior--.

In column 2 (page 1) item [56] at line 14-15, Under Other Publications, change "Corrorision" to --Corrosion--.

In column 1 (page 3) item [56] at line 14, Under Other Publications, change "polyidies" to --polyides--.

In column 1 (page 3) item [56] at line 21, Under Other Publications, change "Corrorsion" to --Corrosion--.

In column 1 (page 3) item [56] at line 27, Under Other Publications, change "mangetron" to --magnetron--.

In column 1 (page 3) item [56] at line 34, Under Other Publications, change "Optiminization" to --Optimization--.

In column 1 (page 3) item [56] at line 36, Under Other Publications, change "Fluoro-expoxide" to --Fluoro-epoxide--.

In column 1 (page 3) item [56] at line 37, Under Other Publications, change "Charactrization" to --Characterization--.

In column 1 (page 3) item [56] at line 46, Under Other Publications, change "Expoxide" to --Epoxide--.

In column 1 (page 3) item [56] at line 47, Under Other Publications, change "Floride" to --Fluoride--.

In the Specification

In column 14 at line 19-20 (approx.), Change "[mm$^3$/N/m]" to --[mm$^3$/Nm]--.

Signed and Sealed this
Eighteenth Day of June, 2013

Teresa Stanek Rea
*Acting Director of the United States Patent and Trademark Office*

CERTIFICATE OF CORRECTION (continued)
U.S. Pat. No. 8,322,754 B2

In column 16 at line 40, Change "TP 31, TP 32)" to --TP31, TP32)--.

In column 17 at line 5, Change "[mm3/N/m]" to --[mm$^3$/Nm]--.

In column 19 at line 18 (approx.), Change "[mm$^3$/N/m]" to --[mm$^3$/Nm]--.

In column 20 at line 5, Change "[mm$^3$/N/m]" to --[mm$^3$/Nm]--.

In column 20 at line 43 (approx.), Change "[mm3/N/m]" to --[mm$^3$/Nm]--.

In column 21-22 at line 43 (approx.), Change "[mm$^3$/N/m]" to --[mm$^3$/Nm]--.

In column 22 at line 67, Change "AT 1" to --AT1--.

In column 23 at line 3, Change "10 wt %" to --10 wt. %--.

In column 23 at line 15, Change "nitroisopthalate" to --nitroisophthalate--.

In column 27 at line 32, Change "TE 108," to --TE108,--.

In the Claims

In column 28 at line 32, In Claim 11, change "wt %," to --wt. %,--.

In column 28 at line 38, In Claim 13, change "wt %" to --wt. %--.

In column 28 at line 49, In Claim 15, change "B 117." to --B117.--.

In column 30 at line 19, In Claim 39, change "wt %" to --wt. %--.

In column 30 at line 27, In Claim 40, change "2.0×10˜6" to --2.0×10$^{-6}$--.

In column 30 at line 31, In Claim 41, change "B 117." to --B117.--.

In column 30 at line 57-58, In Claim 46, change "consisting_of" to --consisting of--.

In column 31 at line 43, In Claim 59, change "wt %" to --wt. %--.